United States Patent
Nakao et al.

(10) Patent No.: US 7,216,360 B2
(45) Date of Patent: May 8, 2007

(54) DEVICE MANAGEMENT SYSTEM, MANAGEMENT CLIENT, CONTROLLER SERVER, METHOD FOR MANAGING USAGE CONTEXT OF DEVICE, AND RECORDING MEDIUM WHICH RECORDS THE METHOD

(75) Inventors: Toshiyuki Nakao, Yokohama (JP); Kazuhiro Hayama, Yokohama (JP); Norihiko Matsuo, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 860 days.

(21) Appl. No.: 09/779,138

(22) Filed: Feb. 8, 2001

(65) Prior Publication Data

US 2001/0054152 A1 Dec. 20, 2001

(30) Foreign Application Priority Data

Feb. 8, 2000 (JP) ............................. 2000-030034

(51) Int. Cl.
G06F 7/04 (2006.01)
(52) U.S. Cl. .................................. 726/7; 726/8; 726/5
(58) Field of Classification Search .................... 726/7, 726/8; 380/231, 232
See application file for complete search history.

(56) References Cited

U.S. PATENT DOCUMENTS

| | | | | |
|---|---|---|---|---|
| 5,128,871 A | * | 7/1992 | Schmitz | ...................... 716/17 |
| 5,448,760 A | * | 9/1995 | Frederick | .................... 455/410 |
| 5,600,364 A | | 2/1997 | Hendricks et al. | |
| 5,602,744 A | * | 2/1997 | Meek et al. | ................. 705/412 |
| 5,642,199 A | | 6/1997 | Ukai et al. | |
| 5,870,610 A | | 2/1999 | Beyda | |
| 2001/0018691 A1 | * | 8/2001 | Sakakibara et al. | ...... 707/104.1 |
| 2001/0042043 A1 | * | 11/2001 | Shear et al. | .................. 705/51 |
| 2003/0137685 A1 | * | 7/2003 | Meade et al. | .............. 358/1.14 |
| 2003/0216971 A1 | * | 11/2003 | Sick et al. | .................... 705/26 |

FOREIGN PATENT DOCUMENTS

| | | |
|---|---|---|
| EP | 0 778 512 A2 | 6/1997 |
| JP | 08-187921 | 7/1996 |
| WO | WO 99/67720 | 12/1999 |

* cited by examiner

*Primary Examiner*—Kambiz Zand
*Assistant Examiner*—Aubrey H. Wyszynski
(74) *Attorney, Agent, or Firm*—Morrison & Foerster LLP

(57) ABSTRACT

A process controlling unit included in a multifunction-device controller sends an acquired ID number and a request for identifying the user corresponding to the ID number, to a controller server. The controller server searches a user management file for user information corresponding to the ID number. The controller server sends, to the multifunction-device controller, information representing that user verification is successfully made when user information is acquired. Upon reception of such information, the process controlling unit permits the verified user to operate a copier making copies of documents. Upon completion of the copying operation, the process controlling unit acquires information representing the number of copies made by the user. Then, the process controlling unit creates usage information of the copier, and sends the created usage information to the controller server. The controller server stores the received usage information into a usage-information management file.

8 Claims, 31 Drawing Sheets

FIG.4A

USER MANAGEMENT FILE 41

| ID NUMBER | NAME | SECTION CODE | SECTION NAME | TELEPHONE NUMBER | FAX NUMBER | E-MAIL ADDRESS |
|---|---|---|---|---|---|---|
| 1234567 | SUSAN BECKER | 123 | ABC SECTION | 1234-5678 | 8765-4321 | yama@ri.co.jp |
| 2345678 | JOHN OLSON | 234 | XYZ SECTION | 2345-6789 | 9876-5432 | ta@ri.co.jp |
| ⋮ | ⋮ | ⋮ | ⋮ | ⋮ | ⋮ | ⋮ |

FIG4.B

DEVICE MANAGEMENT FILE 42

| SERIAL NUMBER | MODEL NAME | CLASSIFIC- ATION | NETWORK ADDRESS | LOCATION | ----- |
|---|---|---|---|---|---|
| 1234 | ABC-1234 | MULTIFUNCTION DEVICE | 192.168.0.1 | 5-TH FLOOR | ----- |
| 2345 | BCD-2345 | PRINTER | 192.168.0.2 | 4-TH FLOOR | ----- |
| ⋮ | ⋮ | ⋮ | ⋮ | ⋮ | |

FIG.4C

DRIVER MANAGEMENT FILE 43

| MODEL NAME | VERSION | STORAGE FOLDER | |
|---|---|---|---|
| ABC-1234 | 1.01 | ¥sys¥abc¥drv | ----- |
| BCD-2345 | 2.03 | ¥sys¥bcd¥drv | ----- |
| ⋮ | ⋮ | ⋮ | ----- |

FIG.5A

USAGE-INFORMATION MANAGEMENT FILE  44

| SERIAL NUMBER | ID NUMBER | BOTH-SIDE PRINTING(SCANNING) | A 4 | A 3 | B 4 | B 5 | ----- |
|---|---|---|---|---|---|---|---|
| 1234 | 1234567 | 12 | 234 | 0 | 0 | 45 | ----- |
| | 2345678 | 0 | 345 | 23 | 456 | 678 | ----- |
| | ⋮ | ⋮ | ⋮ | ⋮ | ⋮ | ⋮ | |

FIG.5B

CUSTOMER-INFORMARION MANAGEMENT FILE  45

| CUSTOMER ID | NAME | COMPANY CODE | COMPANY NAME | FAX NUMBER | EMAIL ADDRESS | ----- |
|---|---|---|---|---|---|---|
| 3456789 | JOHN OLSON | 345 | AB MEDICAL CORPRATION | 3456-7890 | ab@cd.co.jp | ----- |
| 4567890 | SUSAN BECKER | 456 | XY ELECTRONICS | 4567-8901 | bc@de.co.jp | ----- |
| ⋮ | ⋮ | ⋮ | ⋮ | ⋮ | ⋮ | |

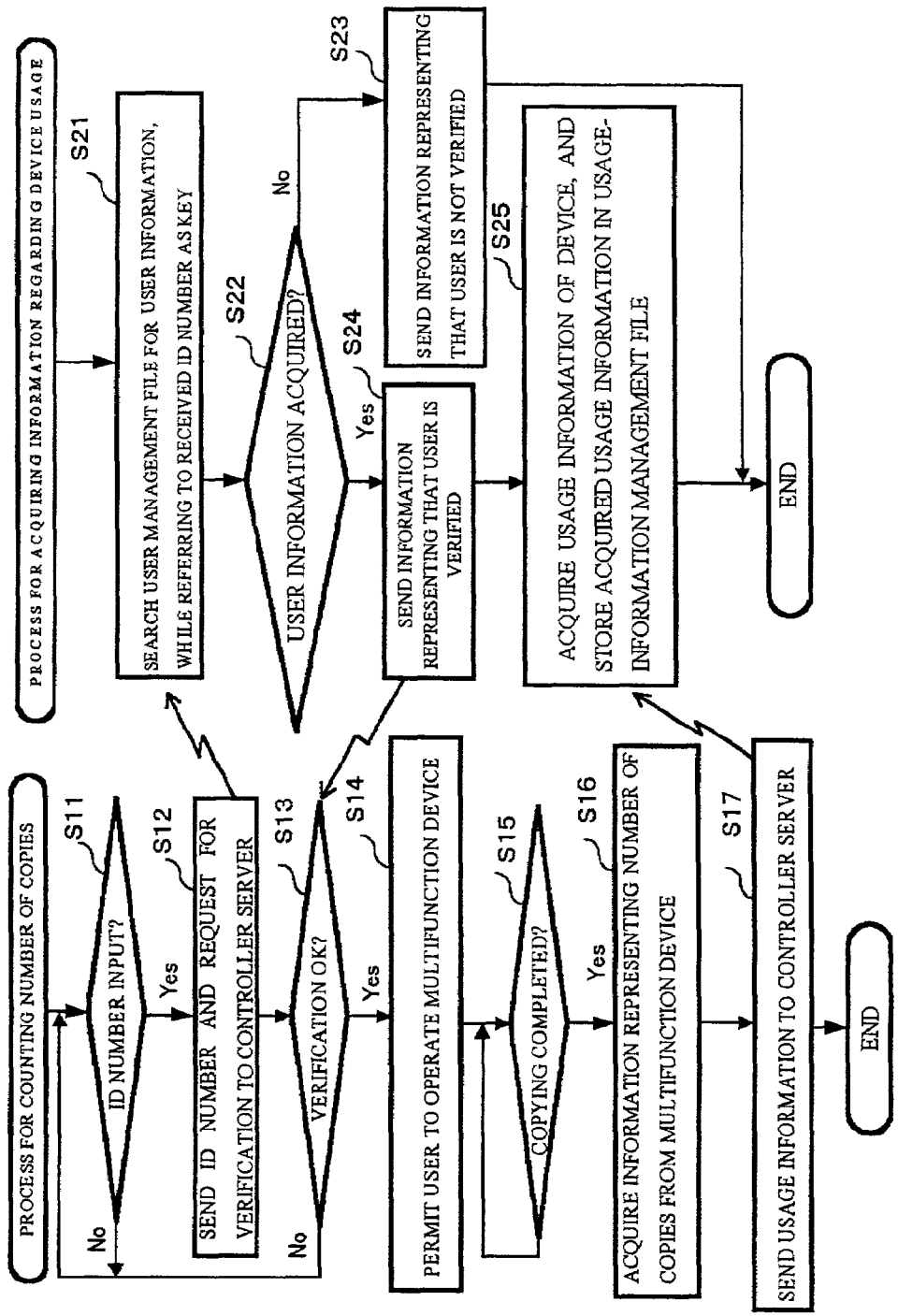

| DEVICE SERIAL | ID | A 4 | B 5 | DATE/TIME | ... |
|---|---|---|---|---|---|
| 1234 | 1234567 | 12 | 24 | 2/8-9:53 | ... |

FIG.7

| NAME | COMPANY | EMAIL ADDRESS | ... |
|---|---|---|---|
| John Olson | ABC Medecal | ab@cd.co.jp | ... |
| Susan Becker | XYZ Electronics | bc@de.co.jp | ... |
| ... | ... | ... | ... |

FIG.10

| MODEL | LOCATION | ... |
|---|---|---|
| ABC-1234 | ABC SECTION | |
| BCD-2345 | XYZ SECTION | |
| --- | --- | |

FIG.12

DEVICE MANAGEMENT FILE

| SERIAL NUMBER | MODEL NAME | CLASSIFICATION | NETWORK ADDRESS | LOCATION | SUGGESTED MAXIMUM NUMBER OF PAPERS TO BE PRINTED MONTHLY | SUGGESTED MAXIMUM NUMBER OF PAPERS TO BE PRINTED ANNUALLY | MAXIMUM NUMBER OF PAPERS BEFORE LASTING DEVICE SUBSTITUTE DEVICE | SUBSTITUTE DEVICE |
|---|---|---|---|---|---|---|---|---|
| 1234 | ABC-1234 | MULTIFUNCTION DEVICE | 192.168.0.1 | 5-TH FLOOR | 12000 | 100000 | 10000 | ABC-9870 |
| 2345 | BCD-2345 | --- | 192.168.0.2 | 4-TH FLOOR | 6000 | 7000 | 10000 | BCD-4416 |
| --- | | | | | | | | |

FIG.13 A

USAGE INFORMATION MANAGEMENT FILE

| SERIAL NUMBER | | | ID NUMBER | BOTH-SIDE PRINTING (SCANNING) | A4 | A3 | B4 | B5 |
|---|---|---|---|---|---|---|---|---|
| 1234 | NUMBER OF PAPERS USED MONTHLY | 4765 | 1234567 | 12 | 234 | 0 | 0 | 45 |
| | NUMBER OF PAPERS USED ANNUALLY | 24680 | 2345678 | 0 | 345 | 23 | 456 | 678 |
| | TOTAL NUMBER OF USE PAPERS | 3394416 | --- | --- | --- | --- | --- | --- |

EMAIL ADDRESSED TO ADMINISTRATOR

MONTHLY USAGE AMOUNT OF DEVICE, SERIAL NUMBER ABC-1234, HAS EXCEEDED SUGGESTED MAXIMUM NUMBER OF PAPERS TO BE USED MONTHLY.

INSTRUCT USERS TO USE, FROM NOW ON, SUBSTITUTE DEVICE, SERIAL NUMBER ABC-9876.

FIG. 15B

EMAIL ADDRESSED TO USER

MONTHLY USAGE AMOUNT OF DEVICE, SERIAL NUMBER ABC-1234, HAS EXCEEDED SUGGESTED MAXIMUM NUMBER OF PAPERS TO BE USED MONTHLY.

USE, FROM NOW ON, SUBSTITUTE DEVICE, SERIAL NUMBER ABC-9876.

FIG. 15C

EMAIL ADDRESSED TO ADMINISTRATOR

ANNUALLY USAGE AMOUNT OF DEVICE, SERIAL NUMBER ABC-1234, HAS EXCEEDED SUGGESTED MAXIMUM NUMBER OF PAPERS TO BE USED ANNUALLY.

INSTRUCT USERS TO USE, FROM NOW ON, SUBSTITUTE DEVICE, SERIAL NUMBER ABC-9876.

FIG. 15D

EMAIL ADDRESSED TO USER

ANNUAL USAGE AMOUNT OF DEVICE, SERIAL NUMBER ABC-1234, HAS EXCEEDED SUGGESTED MAXIMUM NUMBER OF PAPERS TO BE USED ANNUALLY.

USE, FROM NOW ON, SUBSTITUTE DEVICE, SERIAL NUMBER ABC-9876.

DEVICE MANAGEMENT FILE 42

| SERIAL NUMBER | MODEL NAME | CLASSIFICATION | NETWORK ADDRESS | LOCATION |
|---|---|---|---|---|
| 1234 | ABC-1234 | MULTIFUNCTION DEVICE | 192.168.0.1 | 5-TH FLOOR |
| 2345 | BCD-2345 | PRINTER | 192.168.0.2 | 4-TH FLOOR |

| NUMBER OF PAPERS SINCE PREVIOUS REPLACEMENT OF EXPENDABLE 1 (TONER) | NUMBER OF PAPERS OF REMINDING USEAGE OF EXPENDABLE 1 (TONER) | NUMBER OF PAPERS SINCE PREVIOUS REPLACEMENT OF EXPENDABLE 2 (PHOTOCONDUCTOR) | NUMBER OF PAPERS OF REMINDING USEAGE OF EXPENDABLE 2 (PHOTOCONDUCTOR) | NUMBER OF PAPERS SINCE PREVIOUS REPLACEMENT OF EXPENDABLE 2 (PHOTOCONDUCTOR) | NUMBER OF PAPERS OF REMINDING USEAGE OF EXPENDABLE2 (PHOTOCONDUCTOR) | SUBSTITUTE |
|---|---|---|---|---|---|---|
| 22500 | 5500 | 11111 | 12000 | 8800 | 2600 | ABC-9876 |
| 33250 | 4250 | 9999 | 11000 | 6600 | 1500 | BCD-4418 |

EMAIL ADDRESSED TO ADMINISTRATOR

ALMOST TIME TO REPLACE EXPENDABLE 1 (TONER) IN DEVICE, SERIAL NUMBER ABC-1234.

GET READY TO REPLACE TONER 1.

FIG. 18B

EMAIL ADDRESSED TO USER

ALMOST TIME TO REPLACE EXPENDABLE 1 (TONER) IN DEVICE, SERIAL NUMBER ABC-1234.

CHECK OUTPUT PRINT.

IN CASE OF FAILURE, USE DEVICE, SERIAL NUMBER ABC-9876, INSTEAD.

FIG. 19

USER MANAGEMENT FILE 41

| ID NUMBER | NAME | CODE SECTION | CODE NAME | TELEPHONE NUMBER | FAX NUMBER | NUMBER OF PRINTED PAPERS | SUGGESTED MAXIUM NUMBER OF PAPERS TO BE USED MONTHLY | NUMBER OF PRINTED PAPERS | SUGGESTED MINIMUM NUMBER OF PAPERS TO BE USED ANNUALLY | --- |
|---|---|---|---|---|---|---|---|---|---|---|
| 1234567 | SUSAN BECKER | 123 | ABC SECTION | 1234-5678 | 8765-4321 | 721 | 3345 | 3391 | 6691 | --- |
| 2345678 | JOHN OLSON | 234 | XYZ SECTION | 2345-6789 | 9876-5432 | 654 | 765 | 1882 | 2344 | --- |
| --- | --- | --- | --- | --- | --- | --- | --- | --- | --- | --- |

FIG. 21A

EMAIL ADDRESSED TO ADMINISTRATOR

NUMBER OF PAPERS PRINTED BY USER "SUSAN BECKER" HAS EXCEEDED MAXIMUM NUMBER OF PAPERS TO BE PRINTED MONTHLY.

FIG. 21B

EMAIL ADDRESSED TO USER

YOU HAVE PRINTED (USED) NUMBER OF PAPERS WHICH HAS EXCEEDED MAXIMUM NUMBER OF PAPERS TO BE PRINTED MONTHLY.

REFRAIN FROM UNNECESSARY PRINTING.

SECTION MANAGEMENT FILE 48

| SECTION CODE | SECTION NAME | COMPOSITION STAFF ID NUMBER | COMPOSITION STAFF NAME | NUMBER OF PAPERS PRINTED MONTHLY | MAXIMUM NUMBER OF PAPERS TO BE PRINTED MONTHLY | NUMBER OF PAPERS PRINTED ANNUALLY | MAXIMUM NUMBER OF PAPERS TO BE PRINTED ANNUALLY | |
|---|---|---|---|---|---|---|---|---|
| 123 | ABC SECTION | 1234567 3456788 --- | SUSAN BECKER MAT DAVIDSON --- | 1721 | 23345 | 123391 | 226691 | ---- |
| 234 | XYZ SECTION | 2345678 5678901 | JOHN DAWSON ANN GREENIDGE | 1654 | 9765 | 31882 | 92344 | ---- |
| --- | --- | --- | --- | --- | --- | --- | --- | --- |

EMAIL ADDRESSED TO ADMINISTRATOR

NUMBER OF PAPERS PRINTED BY SECTION 123456 HAS EXCEEDED MAXIMUM NUMBER OF PAPERS TO BE USED MONTHLY.

FIG. 24B

EMAIL ADDRESSED TO USER

NUMBER OF PAPERS PRINTED BY SECTION 123456 HAS EXCEEDED MAXIMUM NUMBER OF PAPERS TO BE USED MONTHLY.

REFRAIN FROM UNNECESSARY PRINTING.

DEVICE MANAGEMENT FILE 42

| SERIAL NUMBER | MODEL NAME | CLASSIFICATION | NETWORK ADDRESS | LOCATION | SUGGESTED MAXIMUM NUMBER OF PAPERS TO BE USED MONTHLY | SUGGESTED MAXIMUM NUMBER OF PAPERS TO BE USED ANNUALLY | SUGGESTED MINIMUM NUMBER OF PAPERS TO BE USED MONTHLY | SUGGESTED MINIMUM NUMBER OF PAPERS TO BE USED ANNUALLY | ... |
|---|---|---|---|---|---|---|---|---|---|
| 1234 | ABC-1234 | MULTIFUNCTION DEVICE | 192.168.0.1 | AT WINDOW OF ABC SECTION ON 5-TH FLOOR | 12000 | 100000 | 6000 | 50000 | ... |
| 2345 | BCD-2345 | PRINTER | 192.168.0.2 | AT ENTRANCE OF XYZ SECTION ON 4-TH FLOOR | 6000 | 50000 | 3000 | 25000 | ... |
| ... | ... | ... | ... | ... | ... | ... | ... | ... | ... |

FIG. 25

DEVICE WHICH ARE USED TO PRINT LARGEDR NUMBER OF PAPERS THAN MAXIUM NUMBER OF PAPERS TO BE USED MONTHLY

| CLASSIFICATION | SERIAL NUMBER | LOCATION | MAXIMUM NUMBER OF PAPERS TO BE USED MONTHLY | NUMBER OF PAPERS USED MONTHLY | |
|---|---|---|---|---|---|
| MULTI-FUNCTION DEVICE | 1234 | 5-TH FLOOR | 765 | 766 | ..... |
| | 3574 | 2-TH FLOOR | 22765 | 22775 | ..... |
| | ---- | ---- | ---- | ---- | ---- |
| PRINTER | 2345 | 4-TH FLOOR | 999 | 1000 | ..... |

FIG27A

DEVICE WHICH ARE USED TO PRINT LARGEDR NUMBER OF PAPERS THAN MAXIUM NUMBER OF PAPERS TO BE USED ANNUALY

| CLASSIFICATION | SERIAL NUMBER | LOCATION | MAXIMUM NUMBER OF PAPERS TO BE USED MONTHLY | NUMBER OF PAPERS USED MONTHLY | |
|---|---|---|---|---|---|
| MULTI-FUNCTION DEVICE | 1234 | 5-TH FLOOR | 9765 | 9766 | ..... |
| PRINTER | NONE | | | | ..... |

FIG27B

DEVICE WHICH ARE USED TO PRINT SMALLER NUMBER OF PAPERS THAN MINIMUM NUMBER OF PAPERS TO BE USED MONTHLY

| CLASSIFICATION | SERIAL NUMBER | LOCATION | MINIMUM NUMBER OF PAPERS TO BE USED MONTHLY | NUMBER OF PAPERS USED MONTHLY | ..... |
|---|---|---|---|---|---|
| MULTI-FUNCTION DEVICE | 3329 | 9-TH FLOOR | 500 | 200 | ..... |
| PRINTER | 5234 | 4-TH FLOOR | 2300 | 1000 | ..... |

FIG.27C

DEVICE WHICH ARE USED TO PRINT SMALLER NUMBER OF PAPERS THAN MINIMUM NUMBER OF PAPERS TO BE USED ANNUALLY

| CLASSIFICATION | SERIAL NUMBER | LOCATION | MINIMUM NUMBER OF PAPERS TO BE USED MONTHLY | NUMBER OF PAPERS USED MONTHLY | ..... |
|---|---|---|---|---|---|
| MULTI-FUNCTION DEVICE | 15834 | EXECUTIVE'S ROOM | 9765 | 9766 | ..... |
| PRINTER | 2222 | MEETING ROOM | 22222 | 2222 | ..... |

FIG.27D

DRIVER MANAGEMENT FILE 43

| MODEL NAME | VERSION | SOFTWARE-STORAGE FOLDER | LIST OF USERS HAVING DOWNLOADED DRIVER | | |
|---|---|---|---|---|---|
| | | | 1 | 2 | ... |
| ABC-1234 | 1.01 | ¥sys¥abc¥drv | Y:1234567 | Y:2345678 | ... |
| BCD-2345 | 2.03 | ¥sys¥bcd¥drv | N:1234567 | Y:2348878 | ... |
| ... | ... | ... | ... | ... | ... |

FIG. 28

EMAIL ADDRESSED TO USER HAVING DLOWNLOADED DRIVER-SOFTWARE

DRIVER SOFTWARE OF "PRINTER BCD-2345" IS UPGRADED TO "VERSION 2.03".
DOWNLOAD UPGRADED DRIVER SOFTWARE.

SOFTWARE-STORAGE HOLDER IS "¥sys¥bcd¥drv".

FIG. 30

DEVICE MANAGEMENT SYSTEM, MANAGEMENT CLIENT, CONTROLLER SERVER, METHOD FOR MANAGING USAGE CONTEXT OF DEVICE, AND RECORDING MEDIUM WHICH RECORDS THE METHOD

BACKGROUND OF THE INVENTION

1. Field of the Invention

The present invention relates to a device management system a management client, a controller server, and a method for managing device usage.

2. Description of the Related Art

Conventionally, OA devices such as copiers, printers, etc., are widely used in many offices to improve the efficiency of office work. For example, a copier may be arranged in each section of a company and used by employees to make copies of documents. In addition, a printer may be arranged in each work group within a section to print documents output from terminal devices (such as personal computers, etc.) of the employees.

In recent years so-called "multifunction devices" have been widely used. Such multifunction devices may perform copier functions, scanner functions, printer functions, etc. Such multifunction devices may copy papers, print documents, and also read documents while serving as a scanner so as to acquire image data from the documents.

A plurality of such OA devices may be connected with each other through a Local Area Network (LAN), etc. In such an arrangement each of the OA devices may be operated by manipulation of user terminal devices.

Even if such OA devices are operable by manipulation of user terminal devices, the users must still go to the place where a corresponding OA device is located for some operations. For example, when printing a document from a user's terminal device, the user must go to the printer to get the printed paper. In addition, when copying any papers, the user must go to the copier to operate the copier.

Hence, the efficiency with which office work can be performed depends on the location of the OA device. That is, if the OA device is located far from the user, then the efficiency of the office work may decline, and the cost for managing the system may increase.

To determine whether an OA device is arranged in an optimum location, it is necessary to monitor the usage of each device. Conventionally, the usage of each device is monitored based on a counter value of each device or the number of papers consumed by a user through each printer, etc. For example, a system administrator may sum up the counter values of each copier, to thereby monitor and manage the usage of the OA device in each section.

However, in such case, no consideration is given as to whether the OA device of a predetermined section has been used by a user from another section. Thus, the counter values do not necessarily accurately indicate the usage context of the OA device, as used by the users from a predetermined section. Therefore, the usage context of the OA device can not be optimally managed, according to each section of the company.

Thus, it is difficult to determine whether an OA device is arranged in an optimum location, or whether an optimum number of OA devices have been arranged. Consequently, in such circumstances, it is difficult to enhance the efficiency of office work, and it is difficult to reduce the cost of managing the system.

Further, to use an OA device such as a printer connected to a LAN, it is necessary to install software for driving the OA device. Installation of software is also required when using a new OA device. Because such installation is particularly troublesome, an easy process for installing the software into the OA device is desired.

SUMMARY OF THE INVENTION

It is accordingly an object of the present invention to provide a device management system, a management client, and a controller server for appropriately managing any apparatuses, such as OA apparatuses (including a copier, printer, etc.), and a method for managing usage apparatuses.

In order to accomplish the above object, according to the first aspect of the present invention, there is provided a system for managing a networked device, comprising:

verification means for verifying operation of the device by a verified user, information acquisition means for acquiring device usage information including a value indicating an amount of usage of the device by the verified user, and information storage means for sequentially storing the device usage information acquired by the information acquisition means.

According to this invention, the verification means verifies the user operating the device, in accordance with, for example, the acquired ID number. The usage-information acquisition means acquires usage information including the usage amount (for example, number of used papers) of the device operated by the user verified by the verification means. The usage-information storage means sequentially stores the usage information acquired by the usage-information acquisition means. Accordingly, the usage information of the device is sequentially stored in the usage-information storage means. Of the stored usage information, the usage amount of the device can be calculated according to user, section, etc. as a result of the usage context of the device can properly be managed.

The system may comprise:

user information storage means for storing user information identifying at least one user permitted to operate the device, user information input means for inputting identification information identifying a user operating the device, and user verification means for verifying a user operating the device in accordance with identification information input via the user information input means and user information stored in the user information storage means, the information acquisition means comprising:

counting means for counting an amount of usage of the device by the verified user, and information creation means for creating device usage information, the device usage information comprising the amount of usage of the device counted by the counting means and information for identifying the verified user.

The system may further comprise:

amount acquisition means for acquiring a usage amount record based upon device usage information stored in the information storage means, comparison means for comparing the usage amount record and a reference value and producing a comparison result, and output means for outputting the comparison result.

The system may further comprise:

amount acquisition means for acquiring a usage amount record of an arbitrary device used by an arbitrary user based upon device usage information stored in the information storage means, comparison means for comparing the usage amount record and a reference value and producing a comparison result, and output means for outputting the comparison result.

The system may further comprise:

amount acquisition means for acquiring a usage amount record subsequent to replacement of the replaceable, expendable component in the device, based upon device usage information stored in the information storage means, comparison means for comparing the usage amount record and a reference value and producing a comparison result, and output means for outputting the comparison result.

The device management system may further comprise:

amount acquisition means for acquiring a usage amount record according to the section associated with the user, based upon device usage information stored in the information storage means, comparison means for comparing the usage amount record and a reference value and producing a comparison result, and output means for outputting the comparison result.

In order to achieve the above object, according to the second aspect of the present invention, there is provided a software control system for driving a terminal controlling a networked device, comprising:

storage means for storing driver software for driving the terminal, selection means for selecting a device to be controlled by the terminal, correspondence information storage means for storing correspondence information indicating a correspondence between the software stored in the storage means and the selected device, specification means for specifying driver software for driving the selected device in accordance with the correspondence information stored in the correspondence information storage means, and installation means for providing the terminal with software specified by the specification means via a network and installing the software in the terminal.

According to this invention, the verification means verifies the user operating the device, in accordance with the acquired ID number, for example. The counting means counts the usage amount (for example, the number of used papers) of the device operated by the user verified by the verification means. The usage-information acquisition means acquires usage information including the usage amount counted by the counting means. The usage-information storage means sequentially stores the usage information acquired by the usage-information acquisition means. Accordingly, the usage information of the device is sequentially stored in the usage-information storage means. Based on the stored usage information, the usage amount of the device can be calculated according to user, section, etc. As a result of this, the usage context of the device can desirably be managed.

The above-described device management system may comprise:

input means for inputting information identifying a driver software installer, storage means for storing the information identifying the driver software installer, and output means for identifying the driver software installer, based on the information stored in the storage means, when driver software stored in the storage means is upgraded, and outputting a message to the identified driver software installer.

In the above-described device management system, the storage means comprises means for storing information indicating that a driver software installer wants to be informed about a driver software upgrade, and the output means comprises means responsive to the storage means for informing the driver software installer of a driver software upgrade.

In order to accomplish the above object, according to the third aspect of the present invention, there is provided a networked target device, and a management device, wherein the management device stores user information specifying a user permitted to operate the target device, the target device sends identification information identifying a user operating the target device to the management device, the management device receives the identification information, verifies the user in accordance with the stored user information and the received identification information, and informs the target device of a verification result, the target device permits a user verified by the management device to operate the target device, retrieves a usage amount of the target device used by the user, and informs the management device of the retrieved usage amount, and the management device stores, in association with each other, information corresponding to the informed usage amount, the user, and the used device.

According to this invention, based on the stored usage information, the usage amount of the device can be calculated according to user, section, etc. As a result of this, the usage context of the device can appropriately be managed.

In the above-described device management system, the management device may output a message based on the stored usage information.

In order to accomplish the above object, according to the fourth aspect of the present invention, there is provided a management client for communicating with a controller server that controls a networked target device, comprising:

information input means for inputting identification information identifying a user operating the target device, verification means for sending the identification information to the controller server and verifying the user operating the target device in accordance with response information sent from the controller server, counting means for counting an amount of usage of the target device made by a user operating the target device, and information sending means for sending device usage information, comprising the amount of usage of the target device counted by the counting means, to the controller server.

In order to accomplish the above object, according to the fifth aspect of the present invention, there is provided a controller server for controlling a networked target device through a management client, comprising:

storage means for storing user information specifying a user permitted to operate the target device, identification information acquisition means for acquiring, from the management client via a network, identification information identifying a user operating the target device, verification means for verifying a user operating the target device, in accordance with the identification information acquired by the identification information acquisition means and the user information stored in the user information storage means, information acquisition means for acquiring usage information of the target device, comprising an amount of usage of the target device made by a verified user operating the target device, and information storage means for sequentially storing the usage information acquired by the information acquisition means.

In order to accomplish the above object, according to the sixth aspect of the present invention, there is provided a method for managing usage of a networked device, comprising:

verifying a user operating the device, obtaining an amount of usage of the device made by the verified user operating the device, acquiring usage information of the device comprising the obtained amount of usage of the device, and storing the acquired usage information in a database.

The method may comprises:

processing the usage information stored in the database, and sending a message to at least one of a user of the device and an administrator of the device.

In order to accomplish the above object, according to the seventh aspect of the present invention, there is provided a method for controlling software for driving a control terminal that controls a networked device, comprising:

storing correspondence information indicating a correspondence between driver software for driving the control terminal and the device, selecting a device to be controlled by the control terminal, specifying, in accordance with the stored correspondence information, driver software or driving the selected device, providing the control terminal with the specified driver software via a network, and installing the driver software in the control terminal.

This method may comprises:

storing information associated with a user that has installed driver software in a storage device, identifying a user that has installed driver software in a storage device when the installed driver software is upgraded, and sending a message to the identified user.

In order to accomplish the above object, according to the eighth aspect of the present invention, there is provided a computer program for executing a method of managing use of a networked device, the method comprising:

verifying a user operating the device, obtaining an amount of usage of the device made by the verified user operating the device, acquiring usage information of the device comprising the obtained amount of usage of the device, and storing the acquired usage information in a database.

In order to accomplish the above object, according to the ninth aspect of the present invention, there is provided a computer program for controlling software for driving a control terminal that controls a networked device, comprising:

storing correspondence information indicating a correspondence between driver software for driving the control terminal and the device, selecting a device to be controlled by the control terminal, specifying, in accordance with the stored correspondence information, driver software for driving the selected device, providing the control terminal with the specified driver software via a network, and installing the driver software in the control terminal.

A data signal representing the program may be embodied in carrier wave and may be transmitted through network.

BRIEF DESCRIPTION OF THE DRAWINGS

The object and other objects and advantages of the present invention will become more apparent upon reading of the following detailed description and the accompanying drawings in which:

FIG. 4A is an exemplary diagram showing an example of information in a user management file, FIG. 4B is an exemplary diagram showing an example of information in a device management file, and FIG. 4C is an exemplary diagram showing an example of information in a driver management file;

FIG. 5A is an exemplary diagram showing an example of information in a usage-information information management file, and FIG. 5B is an exemplary diagram showing an example of information in a customer-information management file;

FIG. 6A is a flowchart for explaining a process for counting a number of copies made by a user, and FIG. 6B is a flowchart for explaining a process for acquiring usage information of device, FIG. 7 is an exemplary diagram showing an example of a table of usage information which is created by a process controlling unit;

FIG. 10 is an exemplary diagram showing an example of an email-address table which is sent from a controller server;

FIG. 12 is an exemplary diagram showing an example of printer information which is sent from the controller server;

FIG. 13A is an example of the structure of a device management file employed in the second embodiment of the present invention, and FIG. 13B is an example of the structure of a usage-information management file employed in the second embodiment;

FIGS. 15A and 15B are diagrams exemplifying emails addressed respectively to an administrator and a user, when a number of papers (pages) printed (scanned) monthly with using a device exceeds a suggested-maximum number of papers (pages) to be printed (scanned) monthly, and FIGS. 15C and 15D are diagrams exemplifying emails addressed respectively to an administrator and a user, when a number of papers (pages) printed (scanned) annually with using a device exceeds a suggested-maximum number of papers (pages) to be printed (scanned) annually;

FIG. 16 is a diagram exemplifying the structure of a device management file in the third embodiment of the present invention;

FIGS. 18A and 18B are diagrams exemplifying emails addressed respectively to an administrator and a user, when it is almost time to replace an expendable in a device;

FIG. 19 is a diagram exemplifying the structure of a user management file, in the fourth embodiment of the present invention;

FIGS. 21A and 21B are diagrams exemplifying emails addressed respectively to an administrator and a user, when a number of papers printed by the user exceeds a maximum number of papers to be printed monthly;

FIG. 22 is a diagram exemplifying the structure of a section management file employed in the fifth embodiment of the present invention;

FIGS. 24A and 24B are diagrams exemplifying emails addressed respectively to an administrator and a user, when a number of papers printed by a section exceeds a maximum number of papers to be printed monthly;

FIG. 25 is a diagram exemplifying the structure of a device management file employed in the sixth embodiment of the present invention;

FIGS. 27A and 27B are diagrams exemplifying lists including information representing devices which are used to print larger number of papers than a suggested-maximum number of papers to be used monthly and a suggested-maximum number of papers to be used annually, respectively, and FIGS. 27C and 27D are diagrams exemplifying lists including information representing devices which are used to print smaller number of papers than a suggested-minimum number of papers to be used monthly and a suggested-minimum number of papers to be used annually, respectively;

FIG. 28 is a diagram exemplifying the structure of a driver management file employed in the seventh embodiment of the present invention;

FIG. 30 is a diagram exemplifying an email for informing any user having downloaded the driver about the version upgrade of the driver.

DETAILED DESCRIPTION OF THE PREFERRED EMBODIMENTS

First Embodiment

A device management system, which manages OA (Office Automation) apparatuses, of an embodiment of the present invention will now be explained with reference to the accompanying drawings.

Figure 1:
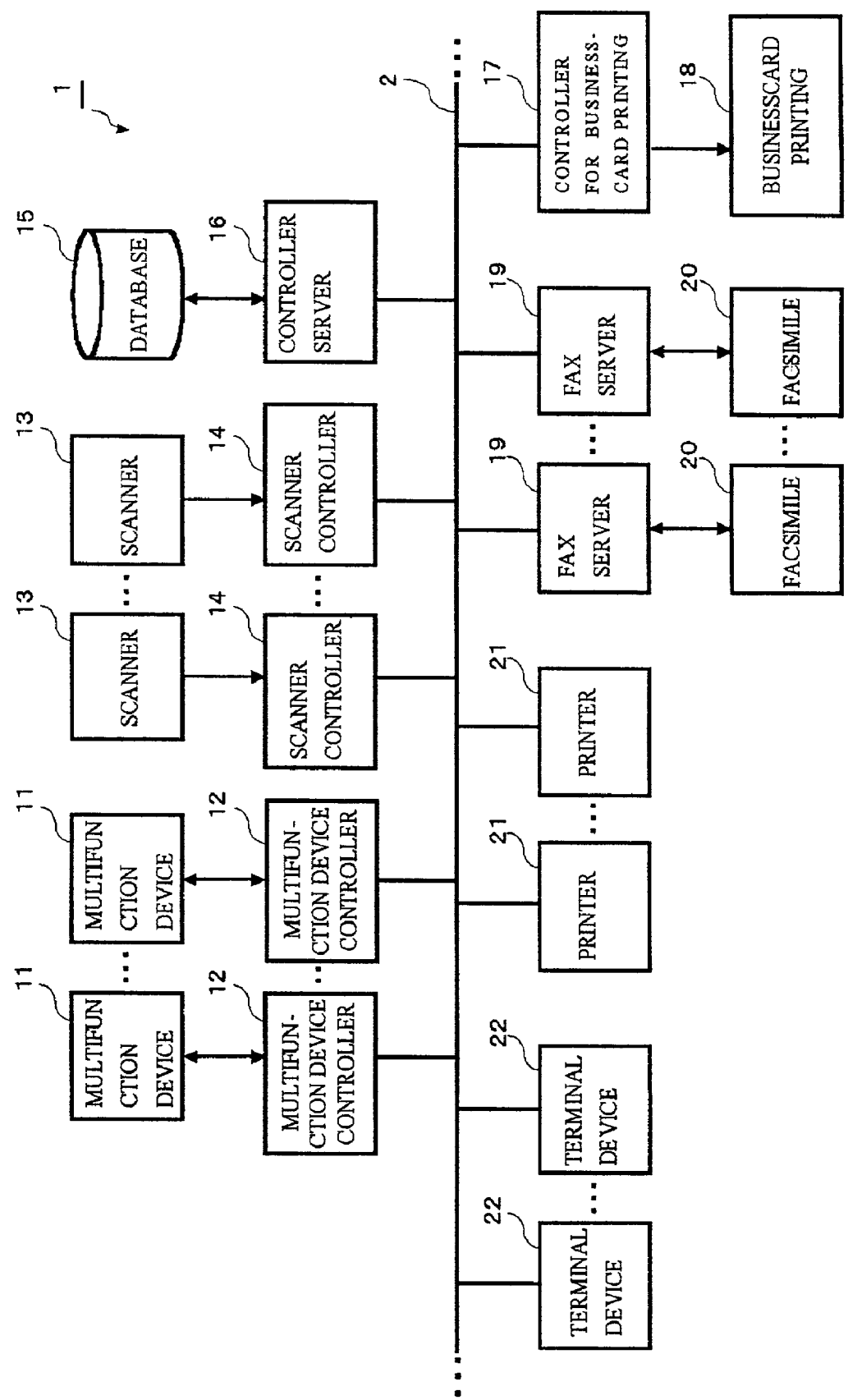
FIG. 1 is a block diagram showing an example of the structure of a device management system according to an embodiment of the present invention.

FIG. 1 is a block diagram showing an example of the structure of a device management system which is employed in this embodiment. As shown in FIG. 1, a device management system 1 comprises a multifunction device 11, a multifunction-device controller 12, a scanner 13, a scanner controller 14, a database 15, a controller server 16, a controller 17 for business-card printing, a printer 18 for business card printing, a FAX server 19, a facsimile 20, a printer 21, and a terminal machine 22.

The multifunction device 12, the scanner controller 14, the controller server 16, the controller 17, the FAX server 19, the printer 21 and the terminal machine 22 are connected with each other through a network 2 such as a LAN (Local Area Network), etc.

The multifunction device 11, the scanner 13, the printer 18, the facsimile 20 and the printer 21 are those OA apparatuses whose usage contexts are to be managed.

The multifunction device 11 is a device which is constituted by a combination of a copier, a scanner, a printer, etc. The multifunction device 11 performs copying, scanning (reading) in accordance with the manipulation of the device by a user, and performs printing of documents output from the terminal machine 22. In many cases, the multifunction device 11 is arranged in each section of a company, etc.

The multifunction-device controller 12 is a client device which sends commands to the controller server 16. The multifunction-device controller 12 sends, to the controller server 16, a request for verifying a user using the multifunction device 11. At that same time, the multifunction-device controller 12 counts the number of copies, which are made by the verified user using the multifunction device 11, for example. Then, the multifunction-device controller 12 creates usage information including the counter number, and provides the controller server 16 with the created usage information through the network 2.

Figure 2:
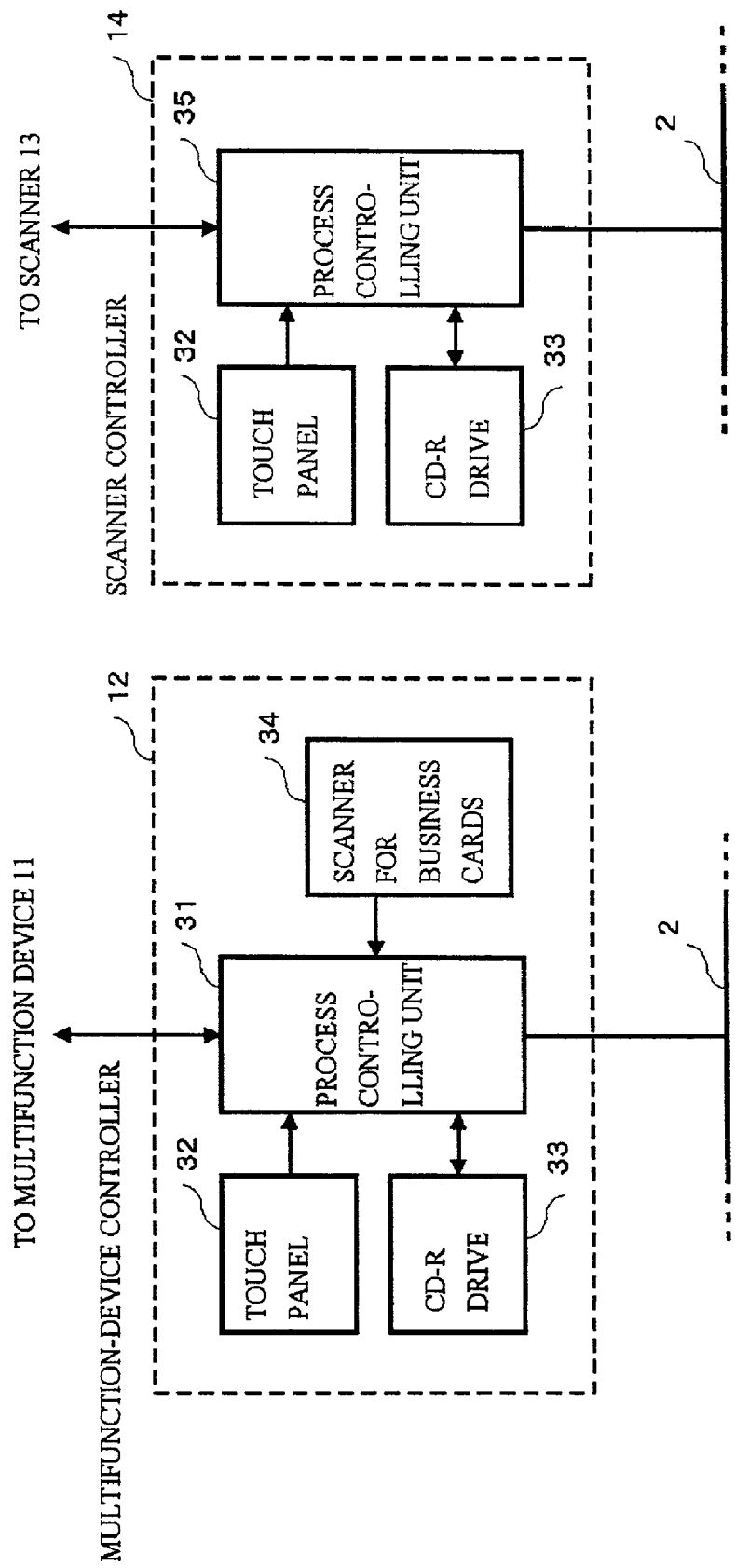
FIG. 2A is a block diagram specifically showing the structure of a multifunction-device controller.
FIG. 2B is a block diagram specifically showing the structure of a scanner controller.
Figure 3:
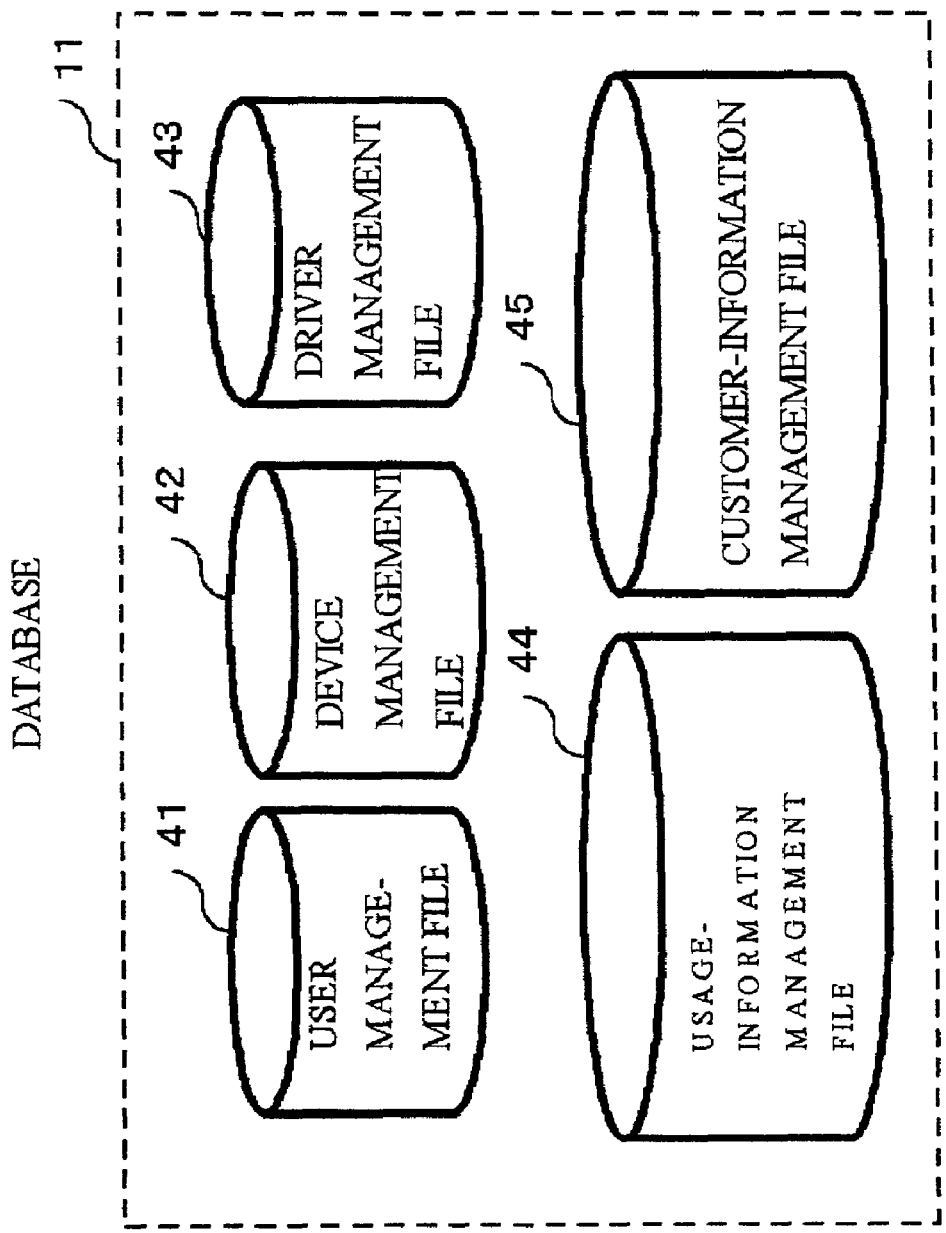
FIG. 3 is a block diagram specifically showing the structure of a database.

In more particular, the multifunction controller 12 comprises a process controlling unit 31, a touch panel 32, a CD-R drive 33, and a scanner 34 for scanning business cards, as shown in FIG. 2A.

The process controlling unit 31 controls the multifunction controller 12 entirely. Particularly, the process controlling unit 31 verifies a user using ID information (for example, an ID number of the user) input through the touch panel 32. After this, the process controlling unit 31 counts the number of copies, which are made by a particular user with the multifunction device 11. Then, the process controlling unit 31 creates usage information including the counter value and information specifying the user, and provides the controller server 16 with the created information through the network 2.

The process controlling unit 31 acquires scanned data (image data) sent from the multifunction device 11, when the multifunction device 11 reads out documents through a scanner function included thereinside. The process controlling unit 31 stores the acquired image data on a disk medium in the CD-R drive 33.

Once the process controlling unit 31 acquires image data representing a business card which is scanned by the scanner 34, it compares text data including the image data with pre-stored reference text data. Then, the process controlling unit 31 identifies the text data in the business card, and converts the text data into a corresponding form of text data.

The touch panel 32 includes an input/output device having a plurality of touch sensors arranged on an LCD unit, for example. The touch panel 32 receives instruction information, which is input by the user in accordance with information displayed on the LCD unit, and provides the process controlling unit 31 with the received instruction information.

The CD-R (Compact Disc Recordable) drive 33 stores a disk medium (CD-R) whose data storage surface is coated with an organic pigment, stores predetermined data by irradiating a laser beam onto the disk medium. For example, the CD-R drive 33 stores the image data read out through the scanner function of the multifunction device 11 on a disk medium.

The scanner 34 is one for business card scanning. The scanner 34 scans a set business card using light intercepting devices, and provides the process controlling unit 31 with the read image data.

The scanner 13 includes semiconductor light-intercepting devices such as CCD (Charge-Coupled Device), and scans documents which are placed on a tray of the scanner 13 so as to input image data. The scanner 13 provides the scanner controller 14 with the input image data. In many cases, the scanner 13 is arranged in each section of a company, for example.

The scanner controller 14 is a client device which communicates with the controller server 16, and controls the scanner 13. The scanner controller 14, as shown in FIG. 2B, comprises a touch panel 32, a CD-R drive 33, a process controlling unit 35.

The process controlling unit 35 controls each unit included in the scanner controller 14. Particularly, the process controlling unit 35 verifies a user by referring to his/her ID number input through the touch panel 32. The process controlling unit 35 counts the number of scanned pages, which are scanned using the scanner 13 in accordance with the manipulation of the verified user. The process controlling unit 35 creates usage information including the counter value, and sends the created usage information to the controller server 16 through the network 2.

The touch panel 32 and the CD-R drive 33 which are illustrated in FIG. 2B have the same structure as those of the respective touch panel 32 and the CD-R drive 33 illustrated in FIG. 2A.

In FIG. 1, the database 15 stores various data for controlling the OA apparatuses, such as the multifunction device 11 to be controlled. Particularly, the database 15 includes a user management file 41, a device management file 42, a driver management file 43, a usage-information management file 44, and a customer-information management file 45.

The user management file 41 is a database for storing information necessary for verifying users of the multifunction device 11, etc. For example, the user management file 41 stores user information including ID numbers of users, user names, section codes of the users, section names, telephone numbers, FAX numbers, etc. in association with each other, as illustrated in FIG. 4A. The information stored in the user management file 41 and the data structure thereof are arbitrary. For example, information regarding users may be once obtained in a CSV format from an existing database, so as to create the above-described user information.

The device management file 42 is a database which stores information for controlling the multifunction device 11. For example, the device management file 42 stores device information including serial numbers, model names, classifications, network addresses, and location.

The driver management file 43 is a database which stores information for controlling driver software, which is necessary for driving the printer 21 and installed in the terminal machine 22. For example, the driver management file 43 stores information including model names, versions, and folders wherein the driver software is stored, as illustrated in FIG. 4C.

The usage-information management file 44 is a database which stores usage information representing usage of OA apparatuses used by the users. For example, the usage-information management file 44 stores usage information including, ID numbers of users operating the OA apparatuses and various papers which are consumed by the respective users. The usage-information management file 44 stores also dates and times at which the users have used each of the apparatuses. The usage-information management file 44 stores such usage information for each OA apparatus.

The customer-information management file 45 is a database which stores information regarding customers of the users. For example, the customer-information management file 45 stores, as shown in FIG. 5B, customer information including customer ID numbers, customer names, company codes, company names, FAX numbers, and email addresses, in association with each other.

The information stored in the customer-information management file 45 and the data structure thereof are arbitrary. For example, information regarding the customers may be once obtained in a CSV format from an existing database, so as to create the above-described customer information. Text data of a business card scanned by the scanner 34 (multifunction-device controller 12) is identified by the process controlling unit 31. The identified text data can sequentially be stored in the customer-information management file 45.

As seen from FIG. 1, the controller server 16 is a server device which controls each unit inside the device management system 1, and includes a predetermined computer system. The controller server 16 performs data communications with the multifunction-device controller 12, the scanner controller 14, and the controller 17 for business card printing. The controller server 16 verifies a user operating an OA apparatus, such as the multifunction device 11, and acquires usage information regarding the usage of the OA apparatus.

The controller server 16 includes a non-illustrative reception mailbox for receipt of emails (a storage area for received emails) and a non-illustrative transmission mailbox for sending emails (storage area for outgoing emails). The controller server 16 has a function as a mail server. The controller server 16 stores, in the reception mailbox, an email which is received through the Internet, and sends the email stored in the transmission mailbox to a corresponding addressee through the Internet.

The controller 17 for business card printing is a client device which communicates with the controller server 16, and controls the printer 18. The controller 17 acquires user information, which represents target users whose business cards are to be created, and which is stored in the user management file 41 through the controller server 16. The controller 17 creates printing information in a predetermined format. Then, the created printing information is sent to the printer 18 so as to be printed.

The printer 18 is a printer including a cutting mechanism for cutting output papers with printed data into a predetermined business card size. The printer 18 prints data for a business card on a predetermined paper in accordance with the printing information sent from the controller 17.

Once the FAX (facsimile) server 19 acquires image data sent from and scanned by the scanner controller 14, etc., it converts the acquired image data into image data in a predetermined data format suitable for facsimile communications. Then, the converted data is sent to a predetermined receiver through the facsimile 20.

The FAX server 19 converts the facsimile data received through the facsimile 20 into image data of a predetermined format. Then, the FAX server 19 stores the converted image data into an internal data storage area. At this time, a message, for informing about the reception of the facsimile data, can be sent to a target terminal machine 22 through the controller server 16.

The facsimile 20 is controlled by the FAX server 19, and connected to a predetermined sender and/or receiver through a public telephone line, so that data for facsimile communications can be transmitted therebetween.

In many cases, the printer 21 includes a page printer, and is arranged for each work-group within a section of a company. If the printer 21 receives printing data sent from the terminal machine 22 through the network 2, it prints out document data on a predetermined paper in accordance with the acquired printing data.

In many cases, the terminal machine 22 includes a personal computer, etc., and is arranged on a desk of each user in the work place. The terminal machine 22 creates printing data to be output to the printer 21, etc., and sends the created printing data to the printer 21 through the network 2. Driver software for driving the printer 21 is read out from the driver management file 43 through the controller server 16, and installed in the terminal machine 22, before a printing operation begins.

After outputting printing data to the printer 21, the terminal machine 22 creates print log information (records of printing performed previously) representing the number of printed pages. The terminal machine 22 sends the created log information to the controller server 16. Based on this print log information, information representing usage of the printer 21 is sent to the controller server 16.

A process for managing device usage, which is carried out by the device management system 1 according to this embodiment, will now specifically be explained with reference to the accompanying drawings.

A process, wherein a user makes a photo-copy of a predetermined document by manipulation of the multifunction device 11, will now be described with reference to FIGS. 6A and 6B. FIG. 6A is a flowchart for explaining a process for counting the number of copies which are made using the multifunction-device controller 12. FIG. 6B is a flowchart for explaining a process for acquiring usage information as performed by the controller server 16.

The process for counting the number of copies, illustrated in FIG. 6A, begins to be carried out, when the user inputs an instruction for making copies through the touch panel 32 of the multifunction-device controller 12. On the contrary, the process for acquiring the usage information, illustrated in FIG. 6B, begins to be carried out, in response to the execution of the process for counting the number of copies.

The process controlling unit 31 of the multifunction-device controller 12 waits until an ID number of the user is input (Step S11). In other words, the process controlling unit 31 does not carry out the following procedures, until the ID number of the user is input through the touch panel 32.

Upon inputting of the ID number through the touch panel 32, the process controlling unit 31 sends the received ID number and a request for verifying the user, to the controller server 16 (Step S12).

Upon reception of the ID number from the process controlling unit 31, the controller server 16 searches the user management file 41 in the database 15 for the received ID number, while referring to the ID number as a key (Step S12).

The controller server 16 determines whether the user information is acquired from the user management file (Step S22). That is, the controller server 16 determines whether the ID number acquired from the process controlling unit 31 is registered in the user management file 41.

When determined that the user information can not be acquired, the controller server 16 can not verify the user operating the multifunction device 11. Hence, the controller server 16 sends information, representing that the user is not verified, to the multifunction-device controller 12 (Step S23), and the process is terminated.

On the contrary, when determined that the user information is acquired, the controller server 16 sends information, representing that the user is verified, to the multifunction-device controller 12 (Step S24). That is, because the controller server 16 did verify the user operating the multifunction device 11, it sends the information, representing that the verification is successfully made, to the process controlling unit 31 through the network 2.

Upon reception of information sent from the controller server 16, the process controlling unit 31 determines whether the received information represents that the verification is successfully made (Step S13).

When the process controlling unit 31 determines that the verification is not made, i.e. "No Good", the flow returns to the procedure of Step S11, and the procedures of the above-described steps S11 to S13 are repeatedly carried out. On the contrary, when the process controlling unit 31 determines that the verification is successfully made, it permits the user to operate the multifunction device 11 (Step S14). That is, the process controlling unit 31 supplies the multifunction device 11 with a predetermined control signal so as to make the multifunction device 11 be operable by the user.

The process controlling unit 31 waits until the user completes operating the multifunction device 11 for making copies (Step S15). During this time, the user makes copies of predetermined documents by manipulation of the multi-function device 11.

If the user has completed making copies of the documents, the process controlling unit 31 acquires information representing the number of copies which are made by the user, from the multifunction device 11 (Step S16).

The process controlling unit 31 creates usage information of device in the form of a table, and sends the created information to the controller server 16 (Step S17). More particularly, the process controlling unit 31 adds information of the ID numbers to the information representing the number of copies, and creates a table of usage information of device, as show in FIG. 7. Then, the process controlling unit 37 sends the created usage information to the controller server 16 through the network 2.

Upon reception of the usage information from the process controlling unit 31, the controller server 16 stores the received usage information in the usage-information management file 44 (Step S25). That is, the controller server 16 stores the usage information representing the usage of the multifunction device 11 by the verified user.

Accordingly, the usage information of an OA apparatus, such as the multifunction device 11 or the like, is sequentially stored in association with each user, in the usage-information management file 44. Based on the stored usage information, the usage of the OA apparatuses can be summed up. In accordance with the summed usage, the amount of money to be charged can also be calculated. As a result of this, the usage context of the OA apparatus can adequately be managed.

Figures 8A, 8B:
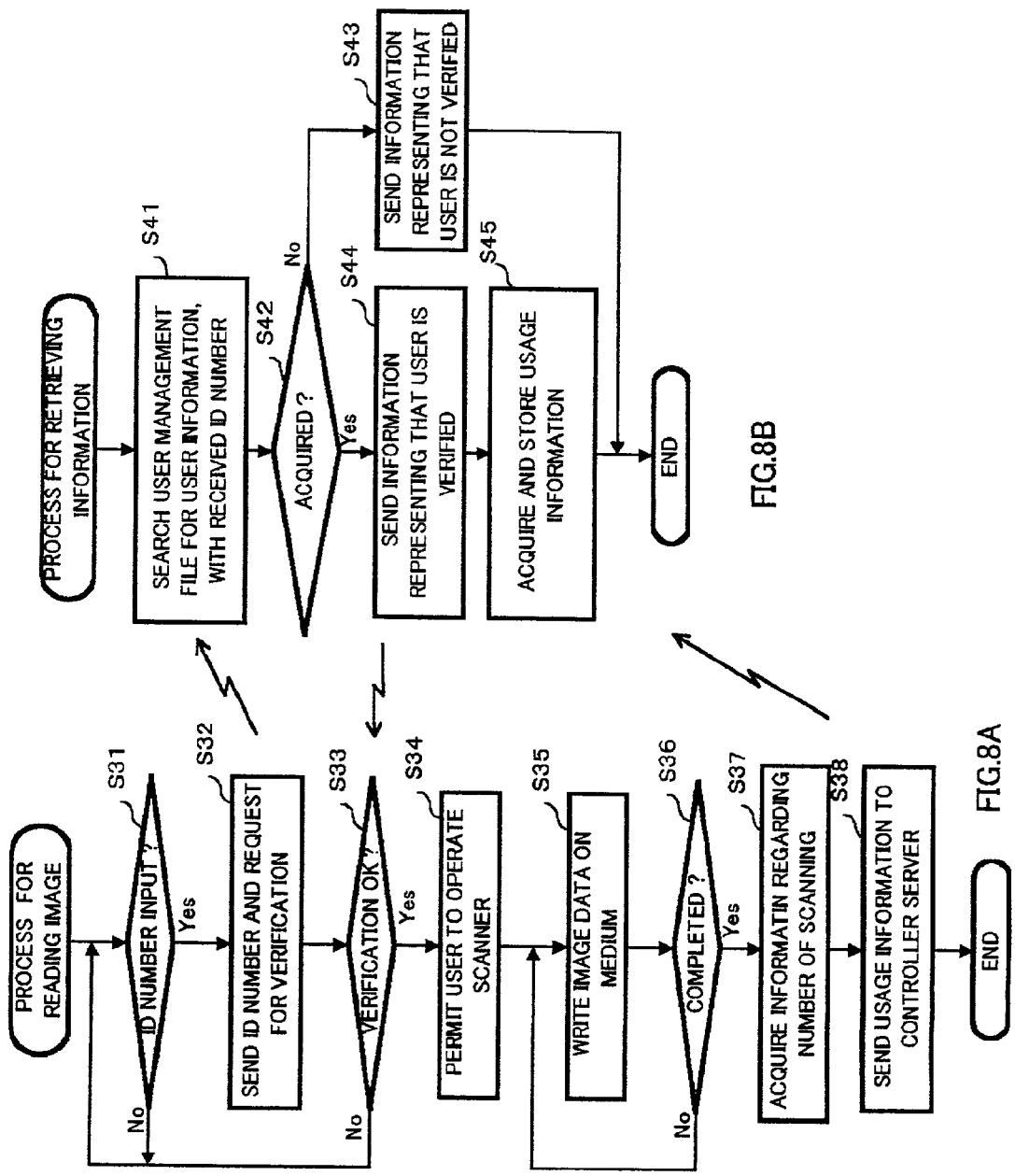
FIG. 8A is a flowchart for explaining a process for reading image data.
FIG. 8B is a flowchart for explaining a process for acquiring usage information of device.

FIG. 8A is a flowchart for explaining a process for reading an image, as carried out by the scanner controller 14. FIG. 8B is a flowchart for explaining a process for acquiring usage information, as carried out by the controller server 16. The process for reading out image data, shown in FIG. 8A, begins to be carried out, when the user inputs an instruction for starting a scanning operation by manipulation of the touch panel 32 of the scanner controller 14. The process for acquiring usage information, shown in FIG. 8B is started, in response to the execution of the process for reading image data.

The process controlling unit 35 included in the scanner controller 14 waits until an ID number is input by manipulation of the touch panel 32 (Step S31). When an ID number is input, the process controlling unit 35 sends the received ID number and a request for verifying the user of the input ID number, to the controller server 16 (Step S32).

The controller server 16 which has received the ID number searches the user management file 41 in the database 15 for user information corresponding to the received ID number, while referring to the ID number as a key (Step S41). Then, the controller server 16 determines whether user information is acquired (Step S42).

When determined that the user information can not be acquired, the controller server 16 sends information representing that user verification is not made, i.e. "No Good", to the scanner controller 14 (Step S43), then the process is terminated. On the contrary, when determined that the user information is acquired, the controller server 16 sends information representing that the user verification is made, i.e. "OK", to the scanner controller 14 (Step S44).

Upon reception of the information from the controller server 16, the process controlling unit 35 determines whether the acquired information is to represent that the verification is successfully made, i.e. "OK" (Step S33).

When the process controlling unit 35 determines that the verification is not made, i.e. "No Good", the flow returns to the procedure of Step S31, and the procedures of the steps 31 to 33 are repeatedly performed. On the contrary, when determined that the verification is made, i.e. "OK", the process controlling unit 35 permits the user to operate the scanner 13 (Step S34).

The process controlling unit 35 supplies the CD-R drive 33 with the read image data, and records the image data on a disk medium (Step S35). Particularly, the process controlling unit 35 converts the image data which is read out from the documents into image data of a TIFF format. Then, the process controlling unit 35 records the converted image data on the disk medium stored in the CD-R drive 33.

The process controlling unit 35 determines whether the scanning operation is completed (Step S36). Until the scanning operation is completed, the read image data is sequentially stored on the disk medium stored in the CD-R drive 33.

Upon completion of the scanning operation, the process controlling unit 35 acquires, from the scanner 13, information representing the number of pages which are scanned in accordance with the manipulation of the scanner 13 by the user (Step S37).

The process controlling unit 35 adds information regarding the ID number of the user, etc. to the information representing the number of scanned pages, and creates usage information of device. Then, the process controlling unit 35 sends the created usage information to the controller server 16 through the network 2 (Step S38).

Upon reception of the usage information sent from the process controlling unit 35, the controller server 16 stores the acquired usage information in the usage-information management file 44 (Step S45).

Accordingly, usage information of the OA apparatus such as the scanner 13 is sequentially stored in the usage-information management file 44 in association with each user. Based on the stored usage information, the usage information of the OA apparatus can be summed up in association with each user or section in a company. In accordance with the summed usage information, the amount of money to be charged can be calculated. As a result of this, the usage context of the OA apparatus can adequately be managed.

In the step S37, the information representing the number of pages which are scanned by the scanner 13 is acquired. The image size of image data recorded on the disk medium in the CD-R drive 33 can be acquired as the usage information of the scanner 13, instead of the number of scanned pages.

Figures 9A, 9B:
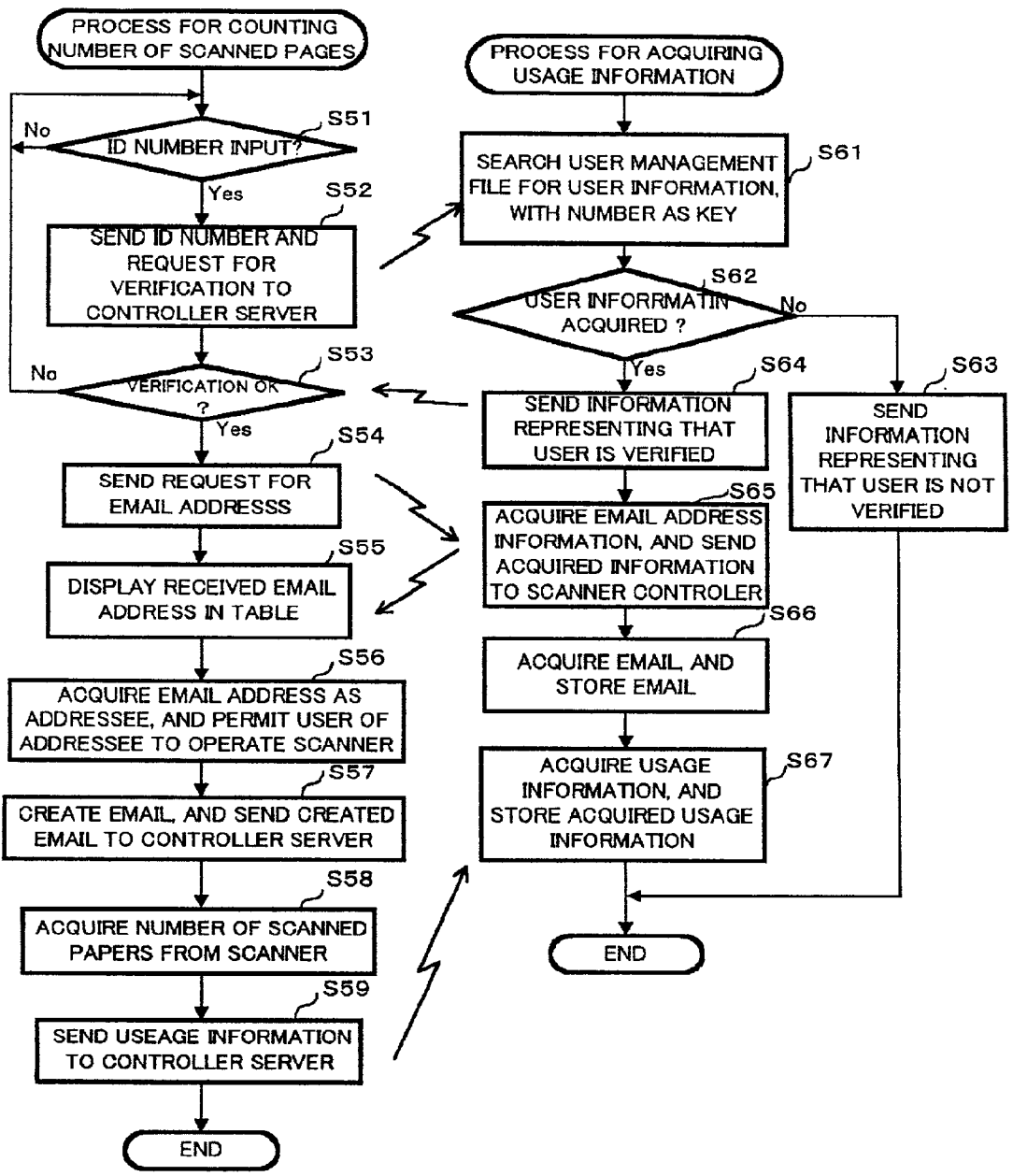
FIG. 9A is a flowchart for explaining a process for counting the number of scanned pages.
FIG. 9B is a flowchart for explaining a process for acquiring usage information of device.

A process for sending the image data read out by the scanner 13 to a customer of a user in the form of an email will now be explained with reference to FIGS. 9A and 9B. FIG. 9A is a flowchart for explaining a process for counting the number of scanned pages, which is carried out by the scanner controller 14. FIG. 9B is a flowchart for explaining a process for acquiring usage information of device, which is carried out by the controller server 16. The process for counting the number of scanned pages, shown in FIG. 9A, begins to be carried out, when the user inputs an instruction for sending an email with attached image data by manipulation of the touch panel 32. On the contrary, the process for acquiring usage information begins to be carried out, in response to the execution of the above process for counting the number of scanned pages.

The process controlling unit 35 waits until the user inputs his/her ID number through the touch panel 32 (Step S51). When the ID number is input, the process controlling unit 35 sends the acquired ID number and a request for verifying the user to the controller server 16 (Step S52).

The controller server 16 which has received the ID number searches the user management file 41 for user information corresponding to the ID number, while referring to the received ID number as a key (Step S61). Then, the controller server 16 determines whether the user information is acquired (Step S62).

When determined that the user information can not be acquired, the controller server 16 sends, to the scanner controller 14, information representing that the user can not successfully be verified, i.e. "No Good" (Step S63), and the process is terminated. On the contrary, when determined that the user information is acquired, the controller server 16 sends, to the scanner controller 14, information representing that the user is successfully verified, i.e. "OK" (Step S64).

Upon reception of the information from the controller server 16, the process controlling unit 35 determines whether the acquired information is to represent that the verification of the user is made, i.e. "OK" (Step S53).

When the process controlling unit 35 determines that the verification is not made, i.e. "No Good", the flow returns to the step S51, and the procedures of the steps 51 to 53 are repeatedly performed. When determined that the verification is made, i.e. "OK", the process controlling unit 35 send a request for sending email addresses of customers of the verified user to the controller server 16 (Step S54).

The controller server 16, which has received a request for sending email addresses, obtains email-address information from the customer information management file 45. Then, the controller server 16 sends the obtained email addresses to the scanner controller 14 (Step S65). Particularly, the controller server 16 entirely reads out information including customer names and their corresponding email addresses, etc., from the customer information management file 45. Then, the controller server 16 creates an email-address table shown in FIG. 10. The controller server 16 sends the created email-address information to the process controlling unit 35 through the network 2.

Upon reception of the email-address information from the controller server 16, the process controlling unit 35 displays the received email addresses on the touch panel 32 in the form of a table (Step S55). The user selects a predetermined addressee or a plurality of addressees included in the displayed table on the touch panel 32.

When an arbitrary addressee is selected by the user, the process controlling unit 35 specifies the email address as an addressee, and permits the user to operate the scanner 13 for a scanning operation (Step S56). Then, the user controls the scanner 13 for reading out image data of a predetermined document.

The process controlling unit 35 creates an email with attached image data which is read out by manipulation of the scanner 13, and sends the created email to the controller server 16 (Step S57).

After acquiring the email sent from the process controlling unit 35, the controller server 16 stores the acquired email into a predetermined reception mailbox (Step S66). The controller server 16 sends the email, which is stored in the reception mailbox at a predetermined timing, to a corresponding addressee through the Internet, etc.

After sending the email to the controller server 16, the process controlling unit 35 acquires information representing the number of scanned pages from the scanner 13 (Step S58).

The process controlling unit 35 adds information including an ID number to the information representing the number of scanned pages, so as to create usage information. Then, the process controlling unit 35 sends the created usage information to the controller server 16 through the network 2 (Step S59).

Upon reception of the usage information from the process controlling unit 35, the controller server 16 stores the received usage information into the usage-information management file 44 (Step S67).

Accordingly, the usage information of the OA apparatus, such as the scanner 13, is sequentially stored in the usage-information management file 44 in association with each user. Based on the stored usage information, the usage information of the OA apparatus can be summed up in association with each user or each section in a company. In accordance with the summed usage information, the amount of money to be charged can also be calculated. As a result of this, the usage context of the OA apparatus can adequately be managed.

In the above process, the image data read out by the scanner 13 is sent to the customer of the user in the form of an email. However, the read image data can be sent to his/her own mailbox.

Figures 11A, 11B:
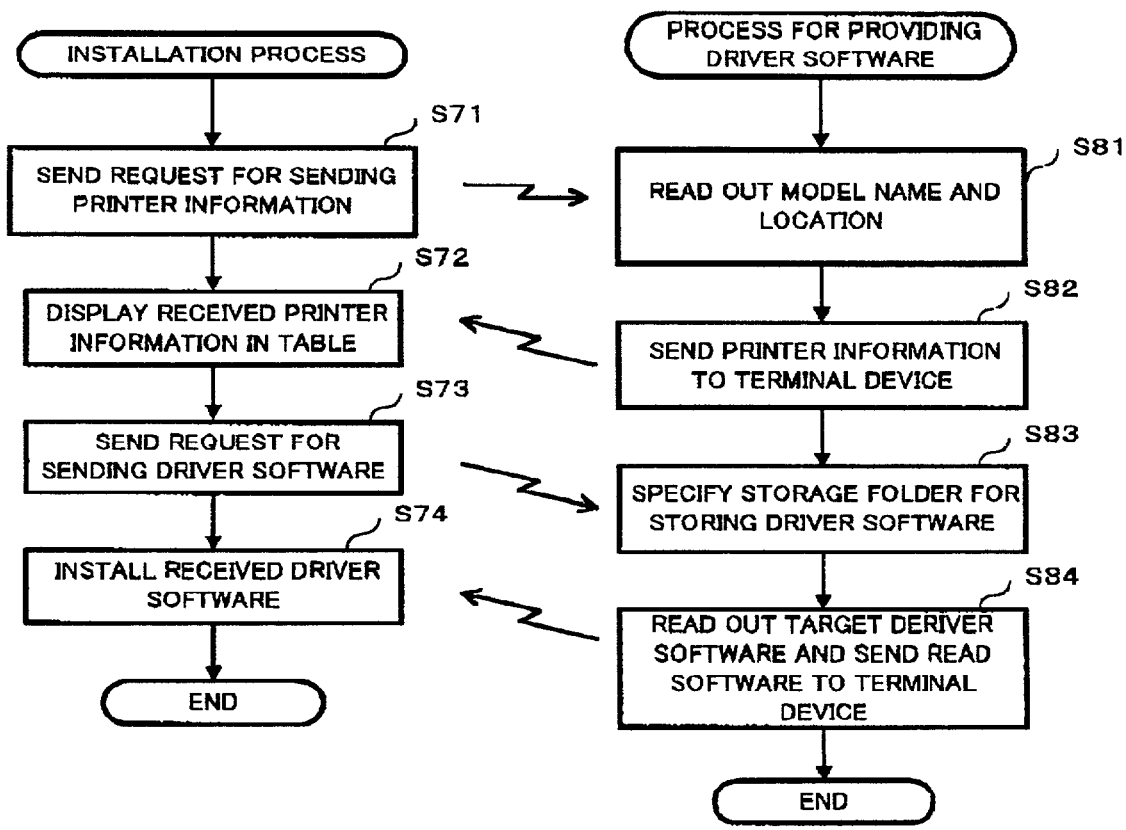
FIG. 11A a flowchart for explaining an installation process.
FIG. 11B is a flowchart for explaining a process for providing driver software.

An operation for installing the driver software for driving the printer 21 will now be explained with reference to FIGS. 11A and 11B. FIG. 11A is a flowchart for explaining a process for installing the software for driving the printer 21, which is carried out by the terminal machine 22. FIG. 11B is a flowchart for explaining a process for providing the software for driving the printer 21, which is carried out by the controller server 16.

The process for installing the software, shown in FIG. 11A, begins to be carried out, when the user inputs an instruction for installing the software using the terminal machine 22. The process for providing the software begins to be carried out, in response to the execution of the process for installing the software.

The terminal machine 22 sends a request for sending printer information to the controller server 16 (Step S71). That is, the terminal machine 22 sends a request for sending printer information including a model name and location of the printer 21 to the controller server 16.

Once the controller server 16 receives the request for sending the printer information, it specifies any device which is classified as a printer, of the devices registered in the device management file 42. The controller server 16 reads out the information including the model name and location of the specified device (Step S81).

The controller server 16 creates printer information shown in FIG. 12, of the information read out from the device management file 42, and sends the created printer information to the terminal machine 22 (Step S82).

Once the terminal machine 22 acquires the printer information, it displays the acquired printer information in the form of a table on a predetermined display section of the terminal machine 22 (Step S72).

If an arbitrary printer, included in the table, is selected by the user, the terminal machine 22 sends the model name of the selected printer and a request for sending the software for driving the printer, to the controller server 16 (Step S73).

Once the controller server 16 receives a request for sending the model name and the software, it accesses the driver management file 43, and specifies a storage folder for storing the driver software (Step S83).

The controller server 16 reads out the software from the specified storage folder, and sends the read software to the terminal machine 22 (Step S84).

Once the terminal machine 22 receives the software sent from the controller server 16, it installs the received software therein (Step S74).

At this time, the installing of the driver software can appropriately be performed in the printer 21 connected onto the network 2, even when another printer 21 (e.g. a printer of another section) needs to be used.

Hence, less power is needed for installing the software, and the latest driver software controlled by the controller server 16 can always be provided.

In the above-described embodiment, the usage information including the counter value regarding the usage of the OA apparatus is simply stored in the usage-information management file 44 in a sequential manner. However, the past record of the usage of the OA apparatus is acquired from the usage-information management file 44, and a message corresponding to the acquired past record may be displayed on the touch panel 32, etc. Explanations will now be made to an example wherein the user makes a copy of a given document by manipulation of the multifunction device 11.

The process controlling unit 31 sends an ID number input by the user to the controller server 16 and a request for verifying the input ID number, as shown in the procedure of Step S12 of FIG. 6A.

The controller server 16 which has received the ID number searches the user management file 41 for the user information corresponding to the received ID number, as shown in the procedures of the steps S21 and S22 of FIG. 6B, so as to verify the user. At this time, the controller server 16 searches the usage-information management file 44 for the usage information, and acquires the past record of the usage of the OA apparatus.

The controller server 16 compares the acquired past record with a predetermined reference value. In the case where the past record is larger than the reference value, the controller server 16 sends the verification result together with a predetermined warning message to the process controlling unit 31.

When the warning message is received, the process controlling unit 31 displays the message on the touch panel 32.

Accordingly, having displayed the warning message, the user can be aware of the fact that the current number of used papers is larger than the reference value. This prevents the user from wasting any unnecessary copies, thus reducing the usage amount of the OA apparatus.

Second Embodiment

In the first embodiment, the explanations have been made to the system which calculates the number of papers used by the user through each OA apparatus. The system can give various kinds of suggestions or advice to the user, based on the calculated data of the usage amount.

Explanations will now be made to the second embodiment of the present invention, wherein a device management system gives advice to a user based on the calculated number of used papers by the user through an OA apparatus.

In the second embodiment, a maximum value of the number of papers to be used is set for each OA apparatus. When the number of used papers reaches the set maximum value, the device management system can inform the user of the reaching of the maximum value.

In this example, the device management file 42 stores, as shown in FIG. 13A, records each of which is divided into a plurality of fields of "Serial Number", "Model Name", "Classification", "Network Address", "Location", ". . . ", "Suggested Maximum Number of Papers to be Used Monthly", "Suggested Maximum Number of Papers to be Used Annually", "Maximum Number of Papers Before Lasting Device", "Substitute Device".

Note that, stored in the field of "Suggested Maximum Number of Papers to be Used Monthly" is a maximum value of usage amount of a corresponding device per month (number of used papers/month), based on the specification of the corresponding device. Stored in the field of "Suggested Maximum Number of Papers to be Used Annually" is a maximum value of usage amount of a corresponding device per year (number of used papers/year), based on the specification of the corresponding device. Stored in the field of "Maximum Number of Papers Before Lasting Device" is a maximum usage amount of a corresponding device (number of used papers/usage period), based on the specification of the corresponding device. Stored in the field of "Substitute Device" is a prospective device to be used when a corresponding device can not desirably be used for some reason.

As illustrated in FIG. 13B, the usage-information management file 44 stores the monthly usage amount (number of papers/month) of a corresponding device and the annual usage amount (number of papers/year) of the device, in addition to the number of used papers classified according to each user.

Operations of the device management system of this embodiment will now be described.

Every time a user makes a photocopy using the multifunction device 11, or prints image data using the printer function of the multifunction device 11, the controller server 16 records the usage amount (number of papers) of the multifunction device 11 according to each user (Step S25 in FIG. 6B, Step S45 in FIG. 8B, Step S67 in FIG. 10B). In this step, the controller server 16 adds the number of papers used by the user at this time to the number of papers used monthly with using the multifunction device 11, the number of papers used annually, and the total number of used papers.

When one month has elapsed since a reference time (date), the controller server 16 resets the number of papers used during the period of time and registered in the usage-information management file 44. When one year has elapsed since the reference date, the controller server 16 resets the number of papers used during the period of time and registered in the usage-information management file 44.

Figure 14:
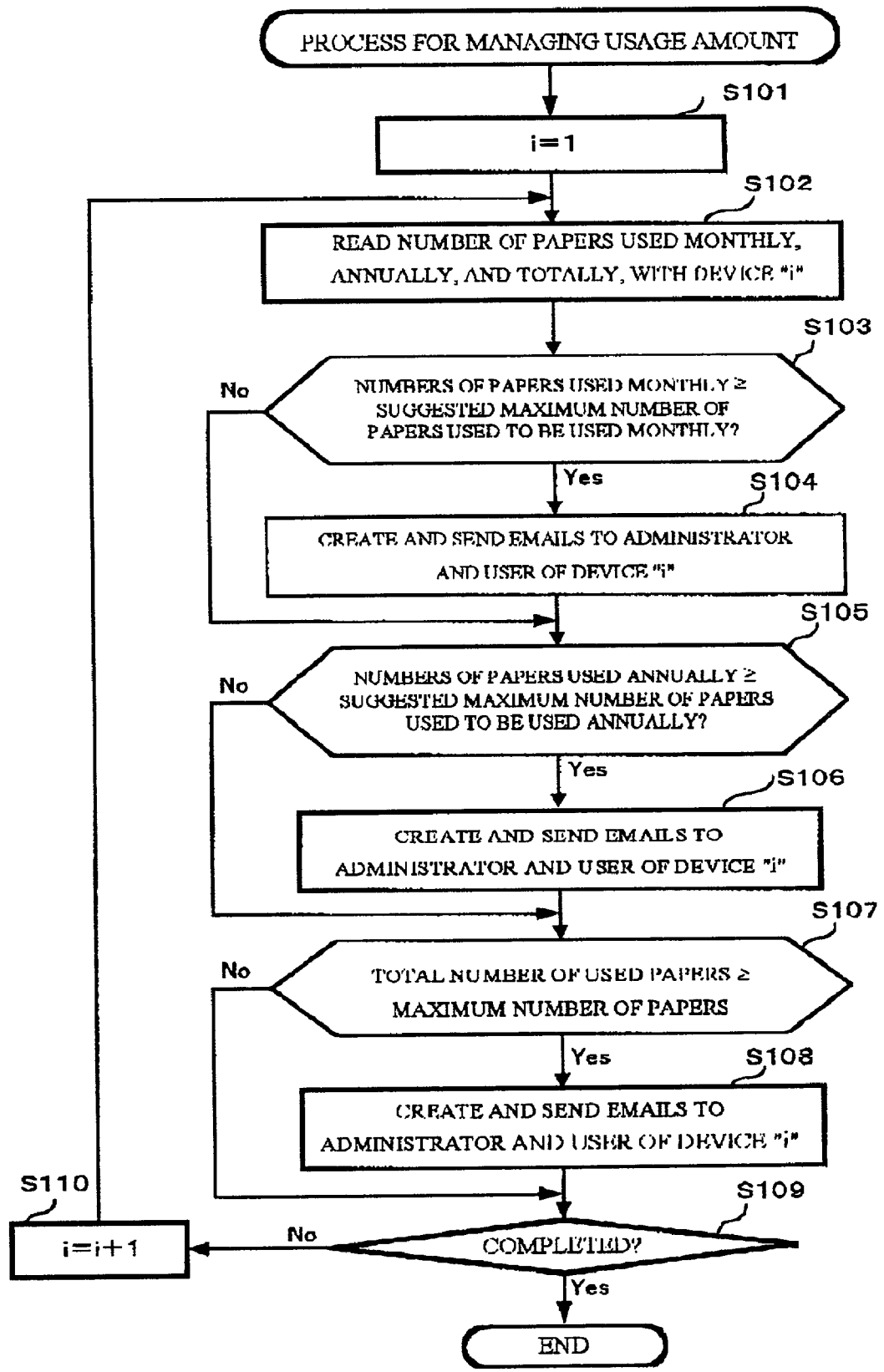
FIG. 14 is a flowchart for explaining a process for managing usage amount, as will be executed by a controller server, in the second embodiment.

The controller server 16 carries out a process shown in FIG. 14 late at night, for example.

The controller server 16 initializes a device number "i" of a corresponding device (Step S101).

Subsequently, the controller server 16 reads out the monthly usage amount (number of papers/month), the annual usage amount (number of papers/year), and the total usage amount (total number of papers) of the device number "i", from the usage-information management file 44 (Step S102).

Then, the controller server 16 determines whether the read number of papers used monthly is equal to or larger than the "Suggested Maximum Number of Papers to be Used Monthly" of the device number "i" which is registered in the device management file 42, shown in FIG. 13B (Step S103). For example, when the device number "i" indicates the multifunction device 123, the "Suggested Maximum Number of Papers to be Used Monthly" is 12,000. Hence, in the step S102, it is determined whether the number of papers used by the user through the multifunction device 1234, during a corresponding monthly period, is equal to or larger than 12,000.

In the case where the number of papers used monthly is equal to or larger than the "Suggested Maximum Number of Papers to be Used Monthly" (Step S103: Yes), the controller server 16 creates emails, like the ones shown in FIGS. 15A and 15B, and sends the created emails to the administrator and the user of the multifunction device, respectively (Step S104). Such emails are to give advice the administrator and the user to use another device, inform about a substitute device, and give a message representing a reason to recommend the use of different device.

Upon reception of the email shown in FIG. 15A, the administrator turns off the multifunction device so that the device can not be operated, for example. Then, the user uses the substitute device, in accordance with the email shown in FIG. 15B.

On the contrary, in the case where the number of papers used monthly is smaller than the "Suggested Maximum Number of Papers to be Used Monthly" (Step S103: No), the flow skips the procedure of the step S104.

After this, the controller server 16 determines whether the read number of papers used annually is equal to or larger than the "Suggested Maximum Number of Papers to be Used Annually" which is registered in the device management file 42 (Step S105).

When it is determined that the number of papers used annually is equal to or larger than the "Suggested Maximum Number of Papers to be Used Annually" (Step S105: Yes), the controller server 16 creates emails, like the ones shown in FIGS. 15C and 15D, and sends them to the administrator and the user of the multifunction device (Step S106). Upon reception of the email, the administrator turns off the device, so that the multifunction device can not be used. Then, the user makes photocopies or prints using the substitute device described in the sent email.

After this, it is determined whether the read number of papers used annually with using the device "i" is equal to or larger than the "Maximum Number of Papers Before Lasting Device" registered din the device management file 42 (Step S105).

It is determined whether the total number of used papers is equal to or larger than the "Maximum Number of Papers Before Lasting Device" registered in the device management file 42 (Step S107).

When it is determined that the total number of used papers is equal to or larger than the "Maximum Number of Papers Before Lasting Device" (Step S107: Yes), the controller server 16 creates the same emails of FIGS. 15A to 15D, and sends them to the administrator and the user (Step S108). Upon reception of the informing email, the administrator turns off the main power of the multifunction device, so that the device can not be used. After this, the user makes photocopies or prints image data using the described substitute device.

Subsequently, the controller server 16 determines whether the device number "i" reaches the final value, i.e., whether the processes for the entire devices are completed (Step s109). When determined that the procedures for the entire devices are not completed (Step S109: No), the controller server 16 updates the device number "i", and repeats the above-described procedures.

When determined that the device number "i" reaches the final number (Step S109: Yes), the flow is terminated.

According to the structure of the multifunction device management system, the situation wherein the device is overused beyond the characteristics of each device can be prevented.

Third Embodiment

In a device management system, it is possible to sum up the number of used papers with using the OA apparatuses, and inform the user that it is time to change expendable supplies of the multifunction device. The third embodiment of such a system will now be explained.

In the third embodiment, as illustrated in FIG. 16, the device management database 42 stores records each of which is divided into a plurality of fields of "Serial number", "Model Name", "Classification", "Network Address", "Location", "Number of Used Papers Since Previous Replacement of Expendable 1", "Number of Used Papers for Reminding Usage Amount of Expendable 1", "Number of Used Papers Since Previous Replacement of Expendable 2", "Number of Papers for Reminding Usage Amount of Expendable 2", "Number of Used Papers Since Previous Replacement of Expendable 3", "Number of Papers for Reminding Usage Amount of Expendable 3", and "Substitute Device".

Registered in the field of "Number of Used Papers Since Previous Replacement of Expendable Supply 1" is the total usage amount (total number of used papers) of a corresponding multifunction device, since the first expendable supply (e.g., toner) included in the device is previously replaced. Registered in the field of "Number of Papers for Reminding Usage Amount of Expendable 1" is a predetermined number of papers. When the number of papers used in the multifunction device reaches the predetermined number since the last time the expendable 1 has been replaced, information representing that the expendable 1 should be replaced is output. The predetermined number is set little smaller than a maximum number of papers which can be printed with a single expendable 1.

Registered in the field of "Number of Used Papers Since Previous Replacement of Expendable 2" is the total usage amount (total number of printed papers) of the device, since the second expendable (e.g., a photoconductor (including a drum, belt, etc.)) has previously been replaced. Registered in the field of "Number of Papers for Reminding Usage Amount of Expendable 2" is a predetermined number of papers. When the number of papers used in the multifunction device reaches the predetermined number since the last time the expendable 2 has been replaced, information representing that the expendable 2 should be replaced is output. The predetermined number is set little smaller than a maximum number of papers which can be printed with a single expendable 2.

Registered in the field of "Number of Used Papers Since Previous Replacement of Expendable 3" is the total usage amount (total number of printed papers) of the device, since the third expendable included in the device has previously been replaced. Registered in the field of "Number of Papers for Reminding Usage Amount of Expendable 3" is a predetermined number of papers. When the number of papers used in the multifunction device reaches the predetermined number since the last time the expendable 3 has been replaced, information representing that the expendable 3 should be replaced is output. The predetermined number is set little smaller than a maximum number of papers which can be printed with a single expendable 3.

Registered in the field of "Substitute" is a device which substitutes for a corresponding device, when the corresponding device can not be used as a result of complete expending of an expendable included in the corresponding device.

Those data registered in the fields of "Number of Used Papers Since Previous Replacement of Expendable 2", "Number of Papers for Reminding Usage Amount of Expendable 2", "Number of Used Papers Since Previous Replacement of Expendable 3", "Number of Papers for Reminding Usage Amount of Expendable 3" are set depending on the necessity.

Figure 17:
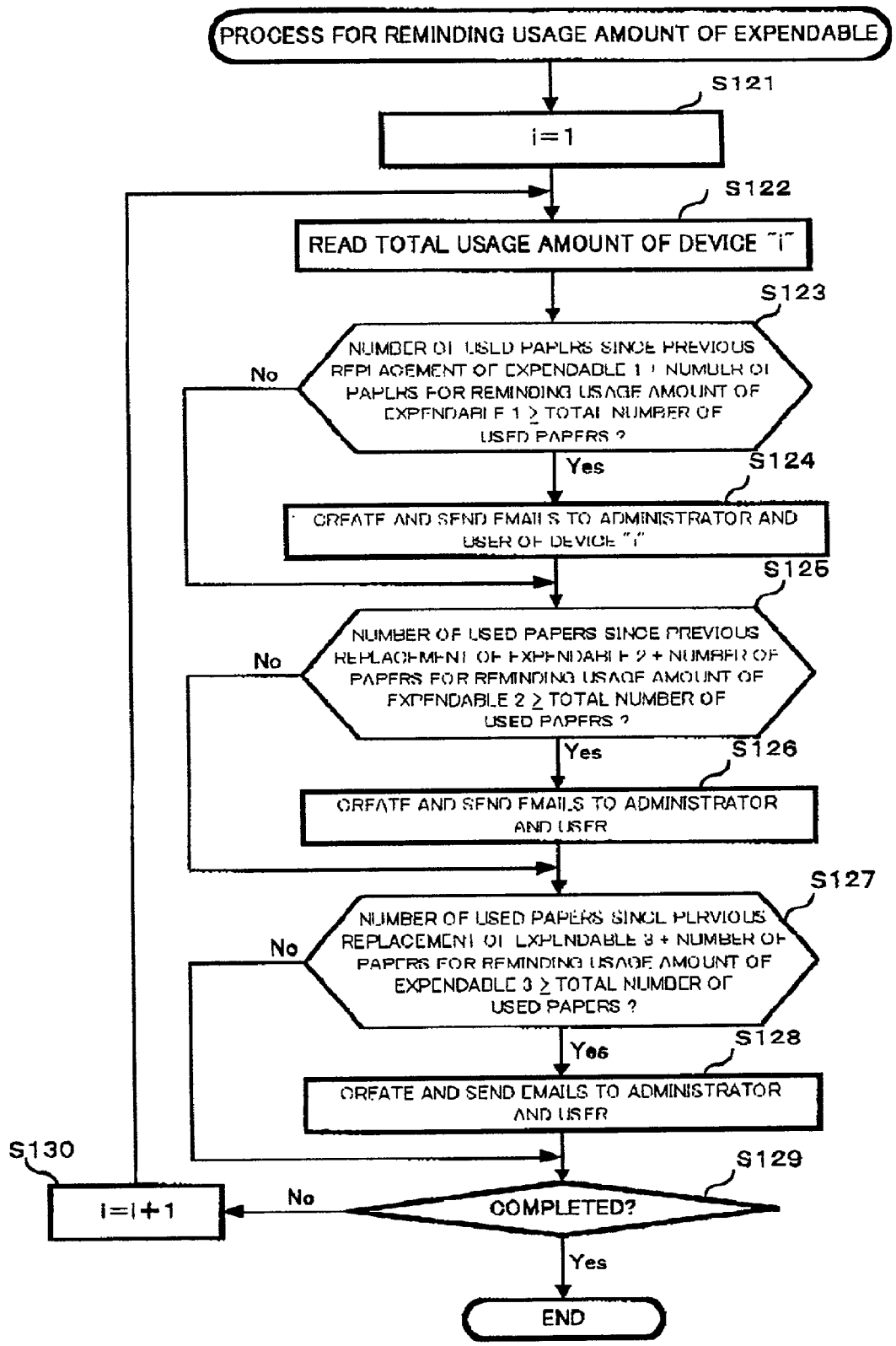
FIG. 17 is a flowchart for explaining a process for reminding usage amount of an expendable, as will be executed by the controller server.

The controller server 16 executes a process which is shown in FIG. 17 late at night, for example.

The controller server 16 initializes a device number "i" of a corresponding device (Step S121).

Subsequently, the controller server 16 obtains information about the totally-used papers, based on the data contents of the usage-information management file 44 (Step S122). Alternatively, the totally-used papers may be derived in advance, as shown in the usage-information management file of FIG. 13B.

After this, the controller server 16 determines whether or not the obtained information regarding the total number of used papers is equal to or larger than the total sum of "Number of Used Papers Since Previous Replacement of Expendable 1", and "Number of Papers for Reminding Usage Amount of Expendable 1" of the device "i", which are registered in the device management file 42, shown in FIG. 16 (Step S123). In other words, it is determined whether the number of used papers with using the device is equal to or larger than "Number of Papers for Reminding Usage Amount of Expendable 1", since the first expendable 1 has previously been replaced.

When it is determined that the total number of used papers is equal to or larger than the total sum of "Number of Used Papers Since Previous Replacement of Expendable 1" and "Number of Papers for Reminding Usage Amount of Expendable 1" (Step S123: Yes), the controller server 16 creates emails, like the ones shown in FIGS. 18A and 18B, and sends the created emails to the administrator and the user of the multifunction device (Step S124). Such emails are to inform the administrator and user of the device that it is nearly time to replace the expendable, and that printing may be deteriorated as a result of complete expending of the expendable, and also about a substitute device.

Upon reception of the email shown in FIG. 18A, the administrator of the multifunction device prepares to replace corresponding expendable. On the other hand, the user uses the substitute described in the email shown in FIG. 18B, as needed.

When determined that the total number of used papers is smaller than the total sum of "Number of Used Papers Since Previous Replacement of Expendable 1" and "Number of Papers for Reminding Usage Amount of Expendable 1" (Step S123: No), the flow skips the procedure of the step S124.

The controller server 16 performs the same process for the expendables 2 and 3 depending on the necessity (Step S125 to S128).

After this, it is determined whether the device number "i" reaches the final value, i.e. whether the processes for the entire devices are completed (Step S129). When determined that the processes for the entire devices are not completed (Step S129: No), the controller server updates the device number "i" (Step S130). Thereafter, the flow returns to the step S122, and the following procedures are sequentially performed as described above.

When determined that the device number "i" reaches the final value, i.e. that the procedures for the entire devices are completed (Step S129: Yes), the process is terminated.

According to such a structure, the user can be aware of the time to replace the expendable included in the device in advance, so as to deal with the matters in the multifunction device.

Fourth Embodiment

Explanations will now be made to the fourth embodiment of a system which can set a maximum number of papers to be used with using an OA apparatus according to each user, and inform each user that the number of used papers has reached the maximum value.

In this example, as shown in FIG. 19, the user management file 41 stores records each of which is divided into a plurality of fields of "ID Number", "Name", "Section Code", "Section Name", "Telephone Number", "FAX Number", "Email Address", "Number of Papers Used Monthly", "Suggested Maximum Number of Papers to be Printed Monthly", "Number of Papers Used Annually", and "Suggested Maximum Number of Papers to be Used Annually".

Registered in the field of "Number of Papers Used Monthly" is the number of printed papers (number of papers/month) which are consumed by a user during a particular month. Registered in the field of "Suggested Maximum Number of Papers to be Used Monthly" is the number of papers to be printed monthly by the user. In this field, different numbers can be set depending on users' work task, post, etc. Registered in the field of "Number of Papers Used Annually" is the number of papers (number of papers/year) used annually by the user. Registered in the field of "Suggested Maximum Number of Papers to be Used Annually" is the maximum value (number of papers/year) of the number of papers to be used annually by the user. In this field, different values can be set depending on users' work task, position, etc.

Operations of this system will now be explained.

Every time one user makes photocopies using the multifunction device 11, or prints image data with the printer 21, the controller server 16 records the usage amount (number of used papers) in the usage-information management file 44 according to each user (Step S25 in FIG. 6B, Step S45 in FIG. 8B, Step S67 in FIG. 10B). Further, in the above steps, the controller server 16 adds the number of used paper(s) to the data of "Number of Papers Used Monthly" and "Number of Papers Used Annually".

When one month has elapsed since a reference date, the controller server 16 resets, to "0", the data of "Number of Papers Used Monthly" registered in the usage-information management file 44. When one year has elapsed since the reference date, the controller server 16 resets, to "0", the data of "Number of Papers Used Annually" registered in the usage-information management file 44.

Figure 20:
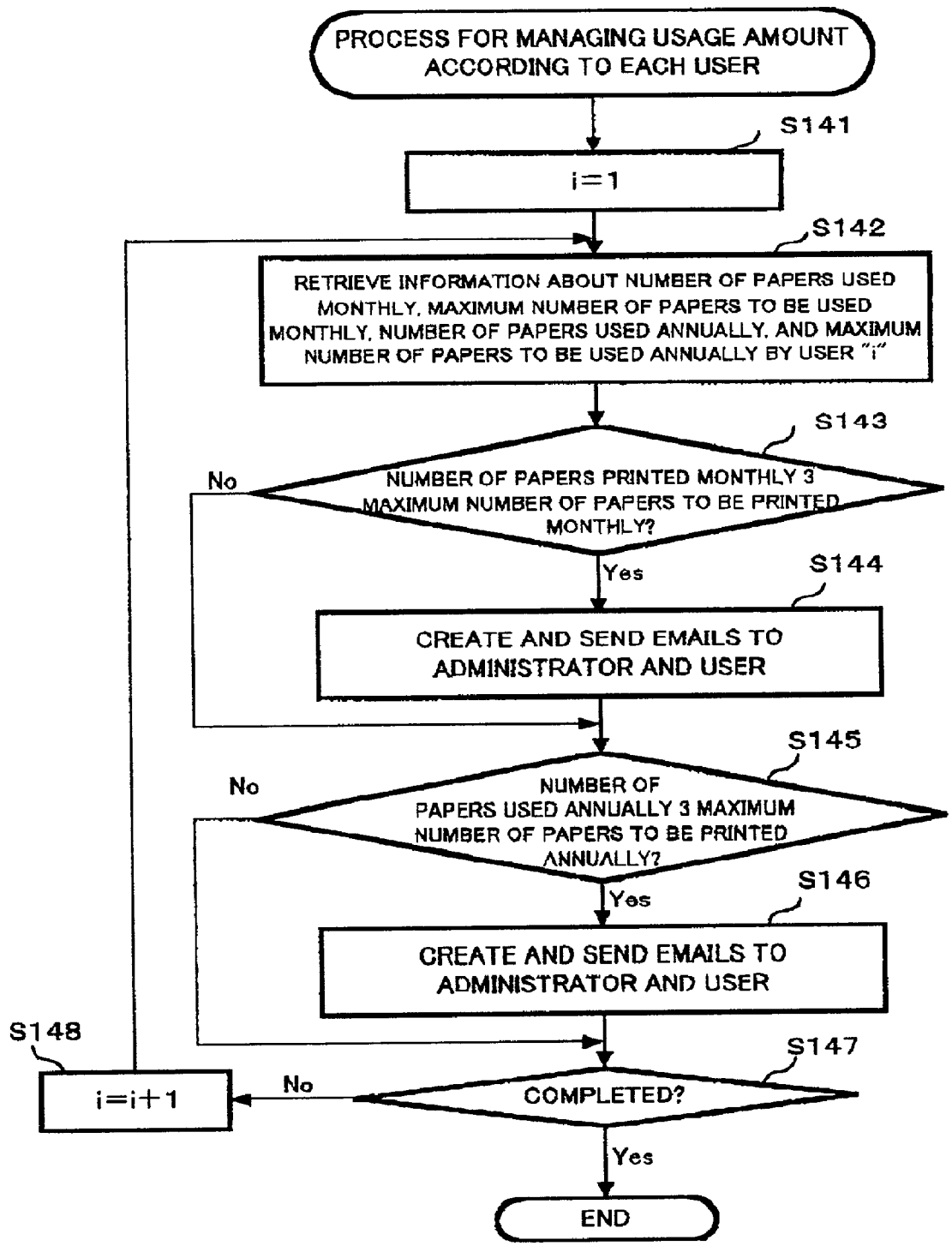
FIG. 20 is a flowchart for explaining a process for managing usage amount according to each user, as will be executed by the controller server, in the fourth embodiment of the present invention.

The controller server 16 executes the entire process which is shown in FIG. 20 late at night, for example.

The controller server 16 initializes a number "i" of a corresponding user (Step S141).

Subsequently, the controller server 16 reads out data of "Number of Papers Used Monthly", "Suggested Maximum Number of Papers to be Used Monthly", "Number of Papers Used Annually", and "Suggested Maximum Number of Papers to be Used Annually", in the record of the user "i", from the user management file 41, shown in FIG. 19 (Step S142).

The controller server 16 determines whether the read number of papers used monthly is equal to or larger than the "Suggested Maximum Number of Papers to be Used Monthly" (Step S143).

When determined that the number of papers used monthly is equal to or larger than the "Suggested Maximum Number of Papers to be Used Monthly" (Step S143: Yes), the controller server 16 creates emails, like the ones shown in FIGS. 21A and 21B, and send them to the administrator and user (Step S144). Such emails are to inform the administrator and user that the number of papers used by the user operating the OA apparatus exceeded the maximum value.

On the contrary, when determined that the "Number of Papers Used Monthly" is smaller than the "Suggested Maximum Number of Papers to be Used Monthly" (Step S143: No), the flow skips Step S144.

After this, the controller server 16 determines whether the read "Number of Papers Used Annually" is equal to or larger than "Suggested Maximum Number of Papers to be Used Annually" (Step S145).

When determined that the "Number of Papers Used Annually" is equal to or larger than "Suggested Maximum Number of Papers to be Used Annually" (Step S145: Yes), the controller server 16 creates emails, like the ones shown in FIGS. 21A and 21B, and send them to the administrator and user (Step S146).

Subsequently, it is determined whether the user number "i" reaches the final value, i.e. whether processes for the entire users are completed (Step S147). When determined that the processes for the entire users are not completed (Step S147: No), the controller server 16 updates the user number "i". Then, the flow returns to the step S142, and the following procedures are repeatedly performed as that described above.

When determined that the user number "i" has reached the final value, i.e. that the procedures for the entire users are completed (Step S147: Yes), the process is terminated.

According to such a structure, it is possible to prevent the user from making an excessive number of copies.

Fifth Embodiment

In the fourth embodiment, the maximum number of used papers while operating the OA apparatus has been set according to each user. However, such setting may be achieved according to each section of a company.

In this embodiment, the user management file 41 includes a section management file 48 which is shown in FIG. 22. The section management file 48 stores records each of which is divided into a plurality of fields of "Section Code", "Section Name", "Composition Staff ID Number", "Composition Staff Name", "Number of Papers Used Monthly", "Maximum Number of Papers to be Used Monthly", "Number of Papers Used Annually", and "Maximum Number of Papers to be Used Annually".

Note that, in the fields of "Section Code" and "Section Name", corresponding section codes and section names are registered. In the field of "Composition Staff ID Number", ID numbers of staff who belong to a corresponding section are registered, while, in the field of "Composition Staff Name", names of staff who belong to the corresponding section are registered. In the field of "Number of Papers Used Monthly", the number of papers (number of papers/month) used monthly by the entire staff who belong to the corresponding section is registered. In the field of "Maximum of Number of Pages to be Used Monthly", the maximum limit value (number of papers/month) of the number of papers to be used monthly by the corresponding section is registered. The maximum number of papers is allocated according to each section, in accordance with work tasks of each section. In the field of "Number of Papers Used Monthly", the number of papers (number of papers/month) used by the section throughout a particular year is registered. In the field of "Maximum Number of Papers to be Used Annually", the maximum number of papers to be used by the corresponding section annually is registered.

Operations of the system according to this embodiment will now be described.

Every time a user makes photocopies with the multifunction device 11, or print image data with the printer 21, the controller server 16 records the number of used papers according to each user in the usage-information management file 44 (Step S25 of FIG. 6B, Step S45 of FIG. 8B, Step S67 of FIG. 10B). In the steps, the controller server 16 determines a section to which the user belongs. In addition, the controller server 16 adds the number of papers used by the user at this time to the data of "Number of Papers Used Monthly" and "Number of Papers Used Annually" which are registered in the section management file 48 shown in FIG. 22.

When one month has elapsed since a reference date, the controller server 16 resets, to "0", data of the "Number of Papers Used Monthly" which is registered in the section management file 48. When one month has elapsed since the reference date, the controller server 16 resets, to "0", data of the "Number of Papers Used Annually" which is registered in the section management file 48.

Figure 23:
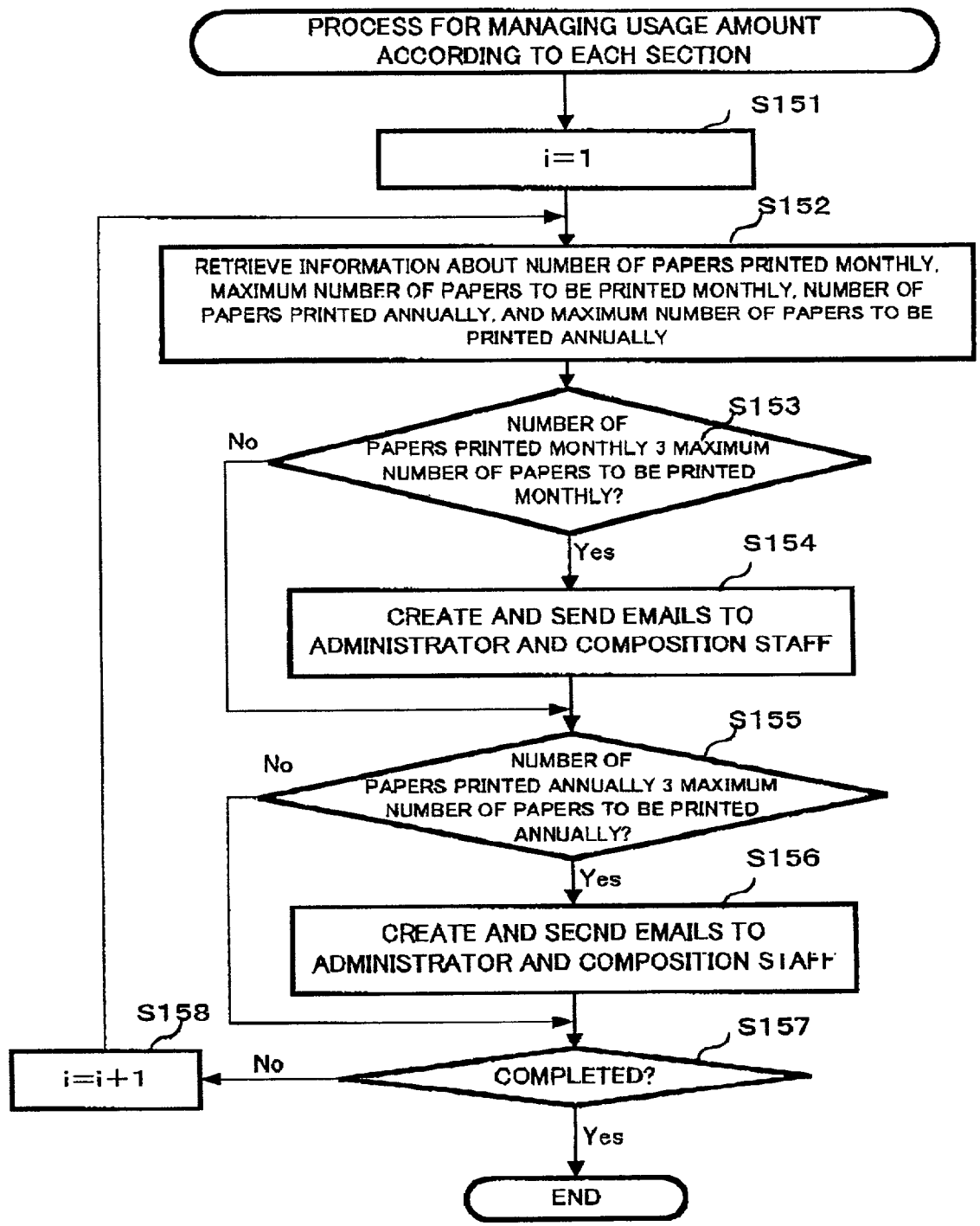
FIG. 23 is a flowchart for explaining a process for managing usage amount according to each section, as will be executed by the controller server, in the fifth embodiment.

The controller server 16 executes the process which is shown in FIG. 23 late at night, for example.

The controller server 16 initializes a section number "i" of a corresponding section in a company (Step S151).

Subsequently, the controller server 16 reads out data of "Number of Papers Used Monthly", "Maximum Number of Papers to be Used Monthly", "Number of Papers Used Annually", and "Maximum Number of Papers to be Used Annually" in the record corresponding to the section "i", from the section management file 48 shown in FIG. 22 (Step S152).

When it is determined that the "Monthly Usage Amount" is equal to or larger than the "Maximum Number of Papers to be Used Monthly" (Step S153).

When determined that the number of papers used monthly is equal to or larger than the "Maximum Number of Papers to be Used Monthly" (Step S153: Yes), the controller server 16 creates emails, like the ones shown in FIGS. 24A and 24B, and sends them to the administrator and any one of the users who belong to the corresponding section (Step S154). Such emails are to inform the administrator and the users that the number of used papers allocated to the section has exceeds the maximum value.

On the contrary, when determined that the number of papers used monthly is smaller than the "Maximum Number of Papers to be Used Monthly (Step S153: No), the flow skips the procedure of the step S154.

Subsequently, the controller server 16 determines whether the read "Number of Papers Used Annually" is equal to or larger than the "Maximum Number of Papers to be Used Annually" (Step S155).

When determined that the "Number of Papers Used Annually" is equal to or larger than the "Maximum Number of Papers to be Used Annually" (Step S155: Yes), the controller server 16 creates emails which are quite resemble to the emails shown in FIGS. 24A and 24B, and sends them to the administrator and the users of the corresponding section (Step S156).

After this, the controller server determines whether the section number "i" has reached the final value, i.e. whether the procedures for the entire sections are completed (Step S157). When determined the procedures for the entire sections are not completed yet (Step S157: No), the controller server 16 updates the section number "i". Then, the flow returns to the step S152, and the following procedures are sequentially performed as described above.

When determined that the section number "i" has reached the final value, i.e. whether the procedures for the entire sections are completed (Step S157: Yes), the process is terminated.

According to such a structure, it is possible to prevent each section from printing an excessive number of papers.

Sixth Embodiment

In the sixth embodiment of the present invention, it is possible to analyze acquired information and effectively use for each apparatus. The sixth embodiment of the present invention will now be described.

In this example, as shown in FIG. 13A, the device management file 42 stores records each of which is divided into a plurality of fields of "Serial Number", "Model Name", "Classification", "Network Address", "Location", ". . . ", "Suggested Maximum Number of Papers to be Used Monthly", "Suggested Maximum Number of Papers to be Used Annually", "Suggested Minimum Number of Papers to be Used Monthly", and "Suggested Minimum Number of Papers to be Used Annually".

Note that the "Suggested Maximum Number of Papers to be Used Monthly" is the maximum number of papers used monthly (number of papers/month), based on the specification of a corresponding device. The "Suggested Maximum Number of Papers to be Used Annually" is the maximum value of usage amount per year (number of papers/year), based on the specification of the corresponding device. The "Suggested Minimum Number of Papers to be Used Monthly" is the minimum value of usage amount per month (number of papers/month), based on the specification of the corresponding device. The "Suggested Minimum Number of papers to be Used Annually" is the minimum value of usage amount per month (number of papers/year), based on the specification of the corresponding device.

As shown in FIG. 13B, the usage-information management file 44 stores the monthly usage amount (number of papers used monthly) and the annually usage amount (number of papers used annually), in addition to the number of used papers according to each user.

Operations of the system according to the sixth embodiment of the present invention will now be described.

Every time a user makes photocopies with the multifunction device 11, or prints image data with the printer, the controller server 16 records the usage amount (number of used papers) according to each user (Step 25 of FIG. 6B, Step S16 of FIG. 8B, Step S67 of FIG. 10B). In the steps, the management server 16 adds the number of papers used by the user at this time is added to the "Number of Papers Used Monthly", "Number of Papers Annually", and "Total Number of Papers" which are registered in the usage-information management file 44 shown in FIG. 13B.

When one month has elapsed since a reference date, the controller server 16 resets, to "0", the data of "Number of Papers Used Monthly" registered in the usage-information management file 44. When one year has elapsed since the reference date, the controller server 16 resets, to "0", the data of "Number of Papers Used Annually" registered in the usage-information management file 44.

The administrator sets in advance whether to extract information about a device with which the user uses the number of papers larger than the "Suggested Maximum Number of Papers to be Used Monthly (and Annually)", whether to extract information about a device with which the user uses the number of papers smaller than the "Suggested Minimum Number of Papers to be Used Monthly (and Annually)", or whether to extract both of the above information.

Figure 26:
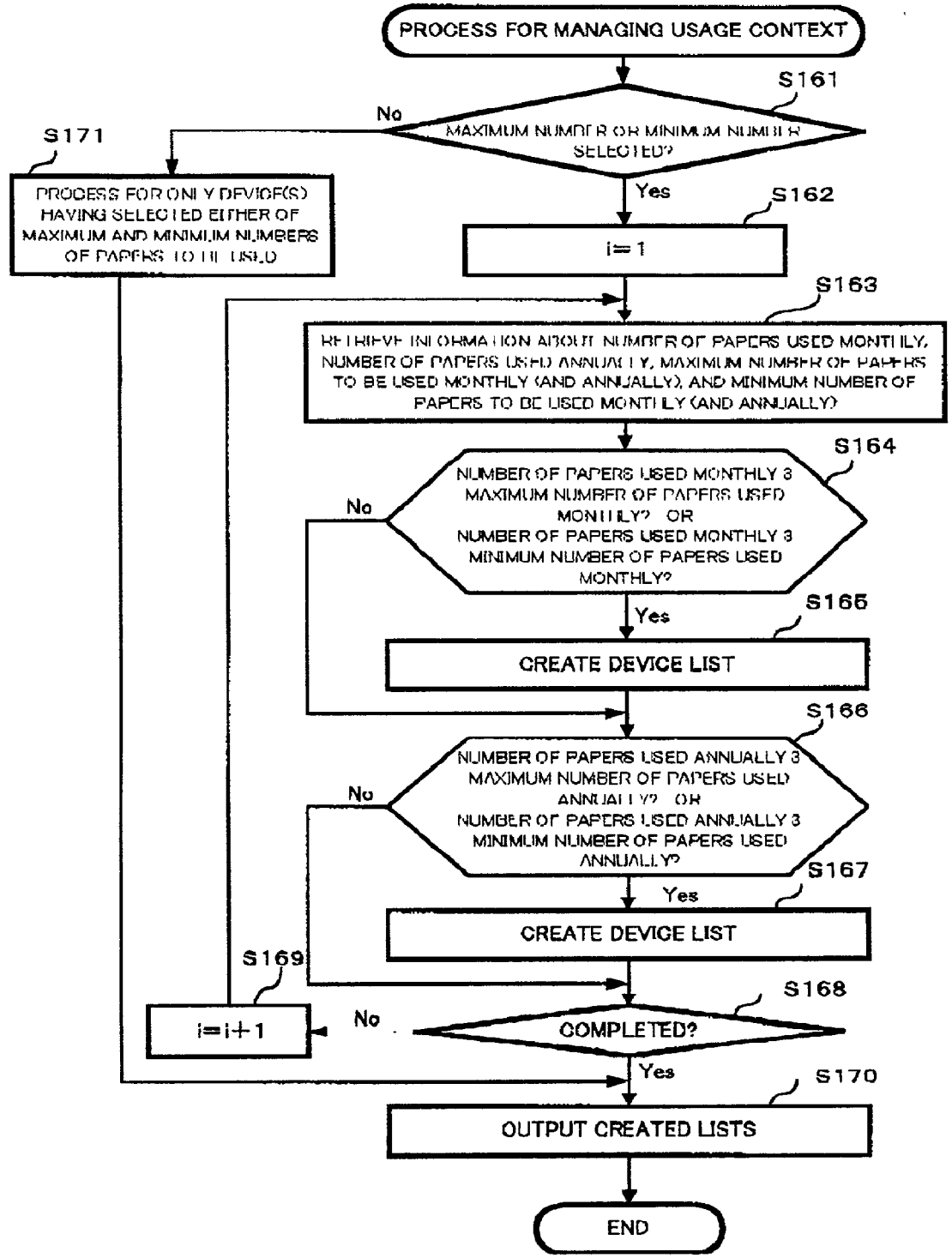
FIG. 26 is a flowchart for explaining a process for managing the usage context, as will be executed by the controller server, in the sixth embodiment.

The controller server 16 executes the process shown in FIG. 26 late at night, for example.

The controller server 16 determines which of the maximum number or minimum number is selected by the administrator of the multifunction device (Step S161).

When determined that both of devices, with one of which the user can use the number of papers equal to or larger than the maximum number and with the other one of which the user can use the number of papers equal to or smaller than the minimum number, are selected (Step S161: No), the controller device 16 initializes a device number "i" (Step S162).

Subsequently, the controller device 16 reads the "Number of Papers Used Monthly (and Annually) in the record corresponding to the device "i" from the usage-information management file 44 shown in FIG. 13B. Additionally, the controller device 16 reads the "Maximum Number of Papers to be Used Monthly (and Annually)" and "Minimum Number of Papers to be Used Monthly (and Annually)" from the device management file 42 (Step S163).

Then, the controller server 16 determines whether the read "Number of Papers Used Monthly" is equal to or larger than the "Suggested Maximum Number of Papers to be Used Monthly", or equal to or smaller than "Suggested Minimum Number of Papers to be Used Monthly" (Step S164).

When determined that the "Number of Papers Used Monthly" is equal to or larger than the "Suggested Maximum Number of Papers to be Used Monthly", or equal to or smaller than the "Suggested Minimum Number of Papers to be Used Monthly" (Step S164: Yes), the controller server 16 adds the device "i" into either one of lists shown in FIGS. 27A and 27C. That is, when determined that the "Number of Papers Used Monthly" is equal to or larger than the "Suggested Maximum Number of Papers to be Used Monthly", the controller server 16 adds the device "i" into the list shown in FIG. 27A. On the other hand, when determined that the "Number of Papers Used Monthly" is equal to or smaller than the "Suggested Minimum Number of Papers to be Used Monthly", the controller server 16 adds the device "i" into the list shown in FIG. 27C.

When determined that the "Number of Papers Used Monthly" is smaller than the "Suggested Maximum Number of Papers to be Used Monthly" and larger than the "Suggested Minimum Number of Papers to be Used Monthly" (Step S164: No), the flow skips the step S165.

After this, the controller server 16 determines whether the read "Number of Papers Used Annually" is equal to or larger than the "Suggested Maximum Number of Papers to be Used Annually" or equal to or smaller than the "Suggested Minimum Number of Papers to be Used Annually" in the record corresponding to the device "i" (Step S166).

When determined that the "Number of Papers Used Annually" is equal to or larger than the "Suggested Maximum Number of Papers to be Used Annually", or equal to or smaller than the "Suggested Minimum Number of Papers to be Used Annually" (Step S166: Yes), the controller server adds the device "i" into either one of lists shown in FIGS. 27B and 27D. That is, when determined that the "Number of Papers Used Annually" is equal to or larger than the "Suggested Maximum Number of Papers to be Used Annually", the controller server 16 adds the device "i" into the list shown in FIG. 27B. On the other hand, when determined that the "Number of Papers Used Annually" is equal to or smaller than the "Suggested Minimum Number of Papers to be Used Annually", the controller server 16 adds the device "i" into the list shown in FIG. 27D.

When determined that the "Number of Papers Used Annually" is smaller than the "Suggested Maximum Number of Papers to be Used Annually" and larger than the "Suggested Minimum Number of Papers to be Used Annually" (Step S166: No), the flow skips the step S167.

Subsequently, the controller server 16 determines whether the device number "i" has reached the final value, i.e. whether the processes for the entire devices are completed (Step S168). When determined the process for the entire devices are not completed (Step S168: No), the controller server 16 updates the device number "i" in the step S169.

Then, the flow returns to the step S163, and the following procedures are repeatedly performed as described above.

When determined that the device number "i" has reached the final value, i.e. whether the processes for the entire devices are completed (Step S168: Yes), the flow is terminated.

According to such a structure, it becomes possible to identify any apparatuses which are overused or not used substantially at all, thus overcoming the inefficiency of the plurality of OA apparatuses.

In the above description, the "Suggested Maximum Number of Papers to be Used" and the "Suggested Minimum Number of Papers to be Used" are compared with the "Number of Papers" which are used by the apparatus. However, the "Number of Papers Used" by the apparatus may be compared only with the "Suggested Maximum Number of Papers to be Used" so as to extract those apparatuses which are overused and to create a list of such apparatuses. Additionally, the "Number of Papers Used" by the apparatus may be compared only with the "Suggested Minimum Number of Papers to be Used" so as to extract those apparatuses which are not used almost at all.

The past data of the "Number of Papers Used" by the apparatus may be stored at intervals of every month or year. Then, an arbitrary month or year is specified, so that the "Suggested Maximum (Minimum) Number of Papers to be Used Monthly or Annually" can be compared with the "Number of Papers Used" of the apparatus in the specified month or year.

Those lists shown in FIGS. 27A to 27D are illustrated only by way of example. Hence, such lists may be displayed or printed in the form, wherein the "Number of Papers Used" by the entire apparatuses, the "Suggested Maximum Number of Papers to be Used" and the "Suggested Minimum Number of Papers to be Used" are shown, and those apparatuses which are overused or rarely used can easily be identified (e.g., data items may be sorted by using different colors).

Seventh Embodiment

When the version of the driver software is upgraded, the user may be informed about the version upgrade of the software.

In this example, the driver management database 43 stores records each of which is divided into a plurality of fields of "Model Name", "Version", "Software-Storage Folder", and "List of Users Having Downloaded Software", as shown in FIG. 28.

Note that, in the field of the "List of Users Having Downloaded Software", ID numbers of staff who have downloaded corresponding driver software are registered. Each of the ID numbers includes a flag (Y:N) set to indicate whether each corresponding user wants to be informed about the version upgrade of the driver software. A flag "Y" is to indicate that its corresponding user wants to be informed about the above fact, whereas a flag "N" is to indicate that its corresponding user does not care about that.

Operations of the device management system according to the seventh embodiment of the present invention will now be explained.

When the user installs driver software in the terminal device 22, the user specifies whether he/she wants to be informed about the software upgrade when the driver software is upgraded in the step S73. The controller server 16 registers the ID number(s) of the users, having downloaded the software, in the driver management file 43 shown in FIG. 28. After this, either one of the flags "Y" and "N" for indicating the user's preference is set.

Figure 29:
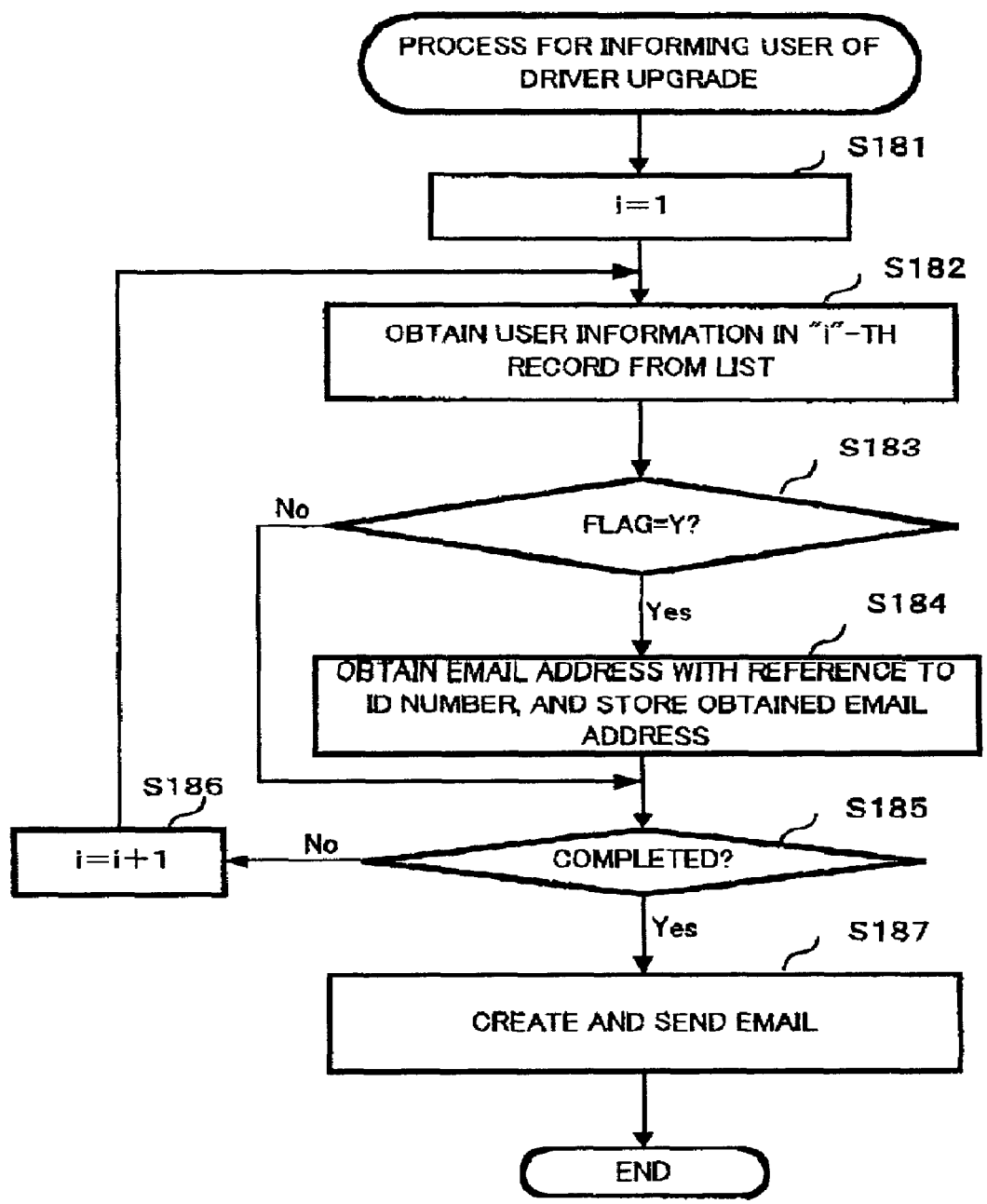
FIG. 29 is a flowchart for explaining a process executed by the controller server, in the seventh embodiment of the present invention.

When the controller server 16 detects the version upgrade described in the driver management file 43, it carries out the process shown in FIG. 29.

The controller server 16 initializes a user number "i" corresponding to a user who has downloaded the driver software.

Subsequently, the controller server 16 acquires information representing the user, who has downloaded the driver software and whose information is registered in an "i"-th record, from the field of the "List of Users Having Downloaded Software" (Step S182).

The controller server 16 determines whether the flag included in the retrieved information is a flag "Y" or not (Step S183).

When determined that the flag included in the retrieved information is a flag "Y", i.e. if the user wishes to be informed about the software upgrade, the controller server 16 refers to the driver management file to retrieve an email address of the user with reference to his/her ID number, and records the retrieved email address (Step S184).

After this, the controller server 16 determines whether the user number "i" has reached the final value, i.e. whether the process for the entire users is competed (Step S185). When determined that the process for the entire users is not completed yet (Step S185: No), the controller server 16 updates the user number "i" in the step S186. Then, the flow returns to the step S182, and the following procedures are sequentially performed as described above.

When determined that the user number "i" has reached the final value, i.e. the processes respectively for the entire users are completed (Step S185: Yes), the controller server 16 creates an email, which is shown in FIG. 30, and sends the created email which is addressed to the email address stored in the step S184 (Step S187).

As seen from the driver management file 43 of FIG. 28, let it be supposed that the driver software is upgraded to version 2.03. The controller server 16 reads out an ID number, 1234567, as information regarding a first user who has firstly downloaded the driver software, from the field of "List of Users Having Downloaded Software". In this case, because the flag "N" is set, no email is sent to the user of the ID number 1234567. After this, the controller server 16 reads out an ID number, 2345678, as information regarding a second user who has secondly downloaded the driver software. In this case, because the flag "Y" is set, an email shown in FIG. 30 is sent to the user of the ID number, 2345678.

According to such a structure of the device management system, the user can easily be aware of the version upgrade of the driver software. In addition, the user can install the driver software as needed.

In the above-embodiments, the user is to be verified based on his/her input ID number. However, the ID information for identifying the user is not limited to the ID number, and is arbitrary. The inputting of the ID information is not limited to using the touch panel 32, and is arbitrary. For example, a magnetic card, on which ID numbers of users are recorded, is read out by a predetermined card reader, thereby to input the recorded ID information.

The device management system according to this embodiment of the present invention can be realized using a common computer system, instead of a dedicated system. For example, a program for executing any one of the above-described operations is installed into a computer from a medium (a floppy disk, CD-ROM or the like) containing the program stored therein, and the program is run on a network OS (Operating System) to execute the above-described process. In thus formed structure, the device management system which execute the above-described processes can be realized.

The method for providing the computer with the program is arbitrary. The program may be provided to the computer through a communications circuit, a communications network, a communications system, etc. For example, the program may be posted to a BBS (Bulletin Board System) on the communications network, and embedded in a carrier wave so as to be transmitted to the users through the network.

The program is activated, and executed in a similar manner to any other application programs under the control of the OS, thereby to execute the above-described processes.

Various embodiments and changes may be made thereonto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-30034 filed on Feb. 8, 2000, and including specification, claims, drawings and summary. The disclosure of the above Japanese Patent Application is incorporated herein by reference in its entirety.

What is claimed is:

1. A system in which a plurality of office automation devices arranged in a work place and a management server managing each of the office automation devices are connected via a network, wherein each of the office automation devices comprises:
   a replaceable, expendable component,
   verification means for verifying a user attempting to operate each of the office automation devices and belonging to a predetermined section of the work place,
   information acquisition means for acquiring device usage information including information of a user verified by the verification means and a value indicating an amount of usage of the office automation device by the verified user,
   information storage means for sequentially storing the device usage information acquired by the information acquisition means,
   wherein the management server comprises:
   information collection means for collecting, via a network, the device usage information stored in the information storage means of each of the office automation devices,
   amount totalizing means for totalizing a usage amount record of the office automation devices, the usage amount record being associated with each user or a section in a company, based on the usage information collected by the information collection means,
   device usage amount acquisition means for acquiring a usage amount record of the office automation device subsequent to replacement of the replaceable, expendable component in the office automation device, based upon device usage information collected by the information collection means,
   comparison means for comparing the usage amount record acquired by the user usage amount acquisition means and a reference value and producing a comparison result, and
   output means for sending, via the network, a message prompting the replacement of the replaceable, expendable component to the office automation device operated by a targeted user, and outputting the message to a display section of the office automation device, in a case where the usage amount exceeds the reference value in the comparison result of the comparison means.

2. The system of claim 1, wherein said verification means of each of the office automation devices comprises:
   user information storage means for storing user information identifying at least one user permitted to operate the office automation device,
   user information input means for inputting identification information identifying a user operating the office automation device, and
   user verification means for verifying a user operating the office automation device in accordance with identification information input via the user information input means and user information stored in the user information storage means,
   the information acquisition means of each of the office automation devices comprising:
   counting means for counting an amount of usage of the office automation device by the verified user, and
   information creation means for creating device usage information, the device usage information comprising the amount of usage of the office automation device counted by the counting means and information for identifying the verified user.

3. The system of claim 1, wherein the management server comprises:
   user usage amount acquisition means for acquiring a usage amount record of an arbitrary office automation device used by an arbitrary user based upon device usage information collected by the information collection means,
   comparison means for comparing the usage amount record acquired by the user usage amount acquisition means and a reference value and producing a comparison result, and
   output means for sending, via the network, a message corresponding to the comparison result and generated by the comparison means to an office automation device operated by a targeted user and outputting the message to a display section of the office automation device.

4. The system of claim 1, wherein the user is associated with a section, and wherein the management server comprises:
   section usage amount acquisition means for acquiring a totalized usage amount record indicating a usage amount of the office automation device totalized for the section associated with the user, based upon device usage information collected by the information collection means,
   comparison means for comparing the totalized usage amount record acquired by the section usage amount acquisition means and a reference value and producing a comparison result, and
   output means for sending, via the network, a message corresponding to the comparison result generated by the comparison means to an office automation device operated by a user of a targeted section and outputting the message to a display section of the office automation device.

5. A system in which a plurality of office automation devices arranged in a work place and a management server managing each of the office automation devices are connected via a network, wherein each of the office automation devices comprises:

a replaceable, expendable component, verification means for verifying a user attempting to operate each of the office automation devices and belonging to a predetermined section of the work place, information acquisition means for acquiring device usage information including information of a user verified by the verification means and a value indicating an amount of usage of the office automation device by the verified user, information storage means for sequentially storing the device usage information acquired by the information acquisition means, wherein the management server comprises:

information collection means for collecting, via a network, the device usage information stored in the information storage means of each of the office automation devices, amount totalizing means for totalizing a usage amount record of the office automation devices, the usage amount record being associated with each user or a section in a company, based on the usage information collected by the information collection means, device usage amount acquisition means for acquiring a usage amount record of the office automation device subsequent to replacement of the replaceable, expendable component in the office automation device, based upon device usage information collected by the information collection means, device usage amount acquisition means for acquiring an amount of usage of each of the office automation devices within a past fixed time period, comparison means for comparing the usage amount record acquired by the user usage amount acquisition means and a reference value and producing a comparison result, output means for sending, via the network, a message prompting the replacement of the replaceable, expendable component to the office automation device operated by a targeted user, outputting the message to a display section of the office automation device, in a case where the usage amount exceeds the reference value in the comparison result of the comparison means, and determination means for comparing the amount of usage acquired by the device usage amount acquisition means, with a reference value, and determining an office automation device which is less frequently used and positioned improperly.

6. The system of claim 5, wherein said verification means of each of the office automation devices comprises:

user information storage means for storing user information identifying at least one user permitted to operate the office automation device, user information input means for inputting identification information identifying a user operating the office automation device, and user verification means for verifying a user operating the office automation device in accordance with identification information input via the user information input means and user information stored in the user information storage means, the information acquisition means of each of the office automation devices comprising:

counting means for counting an amount of usage of the office automation device by the verified user, and information creation means for creating device usage information, the device usage information comprising the amount of usage of the office automation device counted by the counting means and information for identifying the verified user.

7. The system of claim 5, wherein the management server comprises:

user usage amount acquisition means for acquiring a usage amount record of an arbitrary office automation device used by an arbitrary user based upon device usage information collected by the information collection means, comparison means for comparing the usage amount record acquired by the user usage amount acquisition means and a reference value and producing a comparison result, and output means for sending, via the network, a message corresponding to the comparison result and generated by the comparison means to an office automation device operated by a targeted user and outputting the message to a display section of the office automation device.

8. The system of claim 5, wherein the user is associated with a section, and wherein the management server comprises:

section usage amount acquisition means for acquiring a totalized usage amount record indicating a usage amount of the office automation device totalized for the section associated with the user, based upon device usage information collected by the information collection means, comparison means for comparing the totalized usage amount record acquired by the section usage amount acquisition means and a reference value and producing a comparison result, and output means for sending, via the network, a message corresponding to the comparison result generated by the comparison means to an office automation device operated by a user of a targeted section and outputting the message to a display section of the office automation device.

* * * * *